(12) United States Patent
Tang

(10) Patent No.: US 7,857,125 B2
(45) Date of Patent: Dec. 28, 2010

(54) APPARATUS HAVING ROTATING CHAINS OR RINGS FOR CARRYING VERTICALLY HANGING TRAYS

(76) Inventor: Ching Chiang Tang, 914 Baines St., East Palo Alto, CA (US) 94303

( * ) Notice: Subject to any disclaimer, the term of this patent is extended or adjusted under 35 U.S.C. 154(b) by 0 days.

(21) Appl. No.: 12/286,835

(22) Filed: Oct. 1, 2008

(65) Prior Publication Data
US 2009/0186312 A1 Jul. 23, 2009

Related U.S. Application Data

(63) Continuation-in-part of application No. 11/354,201, filed on Feb. 13, 2006, now abandoned, which is a continuation-in-part of application No. 10/730,150, filed on Dec. 7, 2003, now Pat. No. 6,997,705.

(51) Int. Cl.
*B65G 17/16* (2006.01)
(52) U.S. Cl. .................. 198/799; 198/800; 198/801
(58) Field of Classification Search ......... 198/799–802, 198/495
See application file for complete search history.

(56) References Cited

U.S. PATENT DOCUMENTS

| 1,517,272 | A | * | 12/1924 | Woodson | 198/800 |
| 2,696,978 | A | * | 12/1954 | Siegel | 198/802 |
| 2,935,367 | A | * | 5/1960 | Crawford | 198/799 |
| 4,037,715 | A | * | 7/1977 | Onishi et al. | 198/800 |
| 5,415,270 | A | * | 5/1995 | Raupach | 198/801 |
| 6,378,689 | B1 | * | 4/2002 | Wellpott | 198/799 |
| 6,394,260 | B1 | * | 5/2002 | Barth et al. | 198/799 |
| 2005/0230224 | A1 | * | 10/2005 | Grochowski | 198/495 |

* cited by examiner

*Primary Examiner*—James R Bidwell

(57) ABSTRACT

An apparatus for carrying a plurality of vertically hanging trays includes a vertical rotating members comprising a first pair of rotating chains carrying the plurality of trays at respective top bars thereof and a second pair of rotating chains coupled to each top bar through linking bars, the first and second pairs of rotating chains being operatively coupled. The apparatus may be used in a furnace, a cleaning apparatus and a combined furnace cleaning apparatus as well as in medical and other applications.

13 Claims, 25 Drawing Sheets

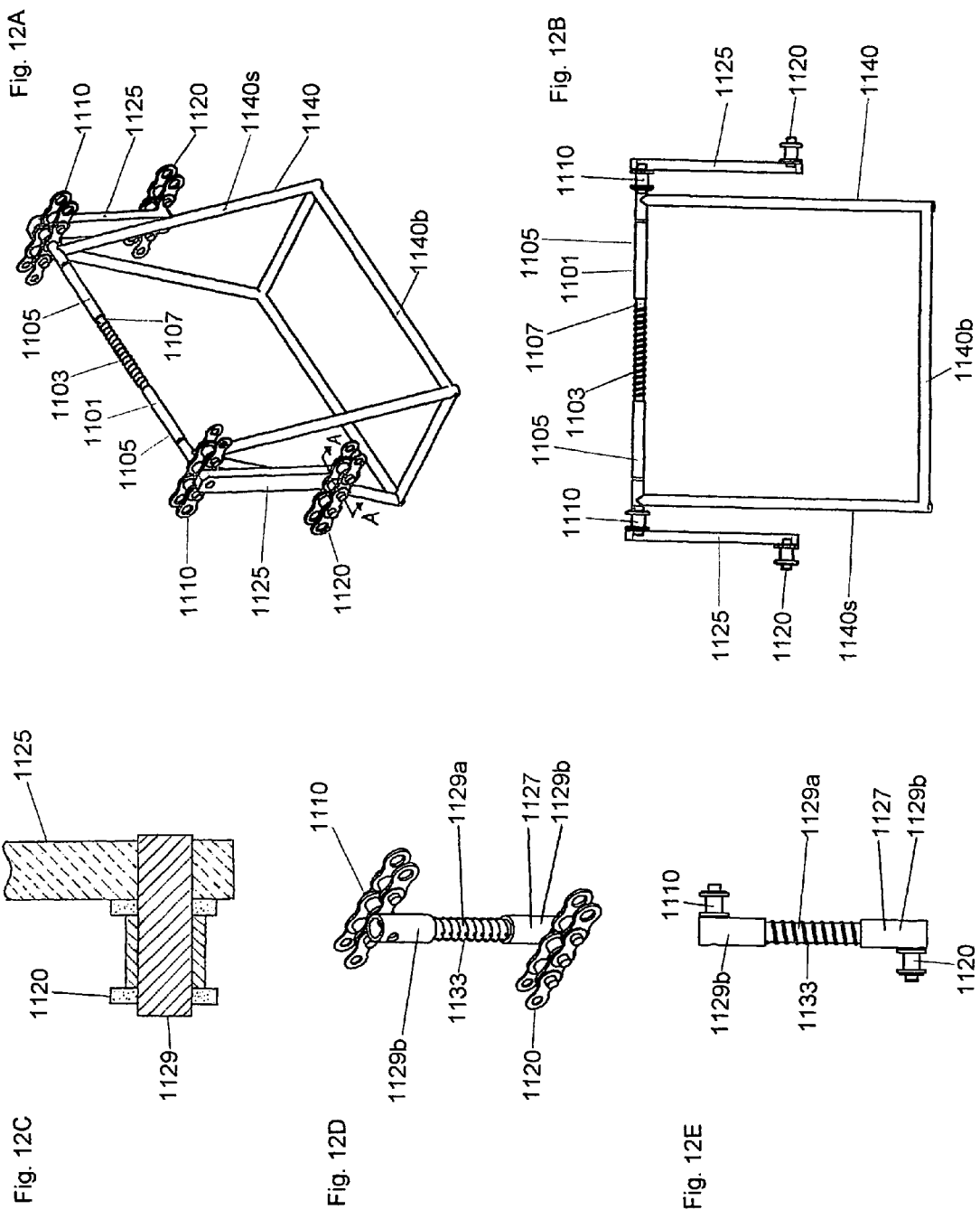

APPARATUS HAVING ROTATING CHAINS OR RINGS FOR CARRYING VERTICALLY HANGING TRAYS

CROSS REFERENCE TO RELATED APPLICATIONS

The present application is a continuation in part application of patent application Ser. No. 11/354,201 filed on Feb. 13, 2006 now abandoned, which is in turn a continuation in part application of patent application Ser. No. 10/730,150 filed on Dec. 7, 2003, now U.S. Pat. No. 6,997,705, the disclosures of which are incorporated herein in their entirety.

BACKGROUND OF THE INVENTION

The invention relates generally to furnace configurations for arranging mechanical and electrical units to carry out heating and cooling processes for electronic component manufacturing, food processing, and medical sterilization. More particularly, the invention relates to a new and improved apparatus for simplifying the processes for electronic component manufacturing, materials processing, and medical applications while reducing energy use and achieving time savings required for such processes.

Conventional furnaces are limited by technical difficulties arising from the use of linear conveyors which are employed to carry objects through the furnace to perform several cycles of heating and cooling through several chambers or zones. Specifically, conventional furnaces used in the electronics industry for processing and soldering Printed Circuit Board (PCB) assemblies are constructed by employing linear conveyors. The object to be heated is placed on the conveyor at an inlet of the furnace and the conveyor then carries the object linearly through a series of heating chambers with pre-set temperatures. Some chambers are equipped with heaters and fans to carry out the pre-heating or intensive heating operations while subsequent chambers are equipped with fans to provide a cooling process of the objects according to process requirements. In this conventional configuration, energy is wasted due to heat losses caused by hot air leaks from the multiple openings in the heat chambers that accommodate the entry and exit of the linear conveyor. Further heat losses are incurred as heated air continuously rises to the top of the heating chambers while the objects pass through the bottom of the heating chambers. Additionally, in a batch process, when the cooling and heating processes are performed in a single chamber, the heating and cooling cycles often prolong the manufacturing processes because the processing cycles require considerable lengths of time for the objects to cool and pre-heat before a next heating cycle may begin. All of these limitations add to the cost and manufacturing complexities when a conventional furnace is employed.

U.S. Pat. No. 5,154,338 discloses an arrangement of heating units with fans in each chamber installed opposite one another above and below the conveyor to constitute a pair along a line and separated by a partial partition so that all the boards can be carried through the chambers from one end (inlet) to another end (outlet). Therefore, at least two operations are required to carry out the tasks of heating profile adjustment, board loading as well as unloading, and quality inspection. The heat generated in each chamber cannot be easily recovered and used again by other chambers unless a special and more costly heat recycle design is implemented to improve the energy recycling. Another limitation of the disclosed arrangement is the limited amount of reduction that can be accomplished in reducing the inner gas consumption by installing the disclosed partitions. The disclosed furnace does not resolve the problem of heat inefficiencies, as the main door of the furnace has to be opened for each loading-unloading cycle. Consequently, the heat applied in the previous batch operation is lost as is the inert gas pumped into the chambers of the furnace. The furnace and the inert gas have to be heated again for each cycle for a period of time.

Another drawback of linear furnaces is that such furnaces are not suitable for applications in offices and laboratories due to the volume occupied by the furnace. Due to the required space, installation of a prior art furnace in a medical laboratory or restaurant for food processing is not feasible even though such furnaces would be quiet convenient and useful for heat treatment.

There is therefore a need for an apparatus that overcomes the limitations of the prior art. There is also a need for an apparatus that is configured for simpler, faster, more energy efficient and economical methods of carrying out heating processes required in varied applications. There is a further need for an apparatus configuration that is smaller, more convenient to operate, and that can be easily adapted for use in different kinds of operational environments for broader applications. There is also a need for an apparatus configured to allow for simplified loading and unloading. There is a further need for an apparatus that minimizes heat losses and reduces inert gas consumption.

SUMMARY OF THE INVENTION

The present invention provides an apparatus having rotating chains which may be enclosed in a furnace housing to enable a substantially vertical rotational movement of objects within the furnace housing to carry out different kinds of heat processes, cooling processes and cleaning processes in a single processing cycle. Special mechanical designs are implemented to assure the objects for heating are maintained at fixed orientations without slipping or shifting position. The losses of heat applied for performing the heat processes are significantly reduced because the loading and unloading processes can be carried out only once at the same location. Efficient utilization of energy is achieved as the heating zone is located on the top portions of the furnace where the hot air generated by the properly arranged heater around the rotating cycle path migrates through convection to the top portions of the chamber with the help of electric fans. The invention thus takes advantage of natural convection to reduce energy consumption.

In accordance with the invention, one person is enabled to carry out both the loading and unloading operations and temperature profile adjustments at one location. Additional benefit is realized because the heat generated in the lower section of the furnace is available at other higher portions of the furnace by natural convection or partial force convection to further enhance the effectiveness of the heating processes.

In one aspect of the invention, an apparatus for carrying a plurality of vertically hanging trays includes a vertical rotating means comprising a first pair of rotating chains carrying the plurality of trays at respective top bars thereof and a second pair of rotating chains coupled to each top bar through linking bars, the first and second pairs of rotating chains being operatively coupled.

In another aspect of the invention, a furnace includes a housing forming an enclosure, a heating means for heating the enclosure, an opening formed in the housing, and a vertical rotating means comprising a first pair of rotating chains carrying the plurality of trays at respective top bars thereof and a second pair of rotating chains coupled to each top bar through linking bars, the first and second pairs of rotating chains being operatively coupled.

These and other objects and advantages of the present invention will no doubt become obvious to those of ordinary skill in the art after having read the following detailed description of the preferred embodiment that is illustrated in the various drawing figures.

BRIEF DESCRIPTION OF THE DRAWINGS

FIG. 12A is a perspective view of a hanging tray of the vertical rotational system of FIG. 11 in accordance with the invention;

FIG. 12B is a side elevation view of the hanging tray of FIG. 12A in accordance with the invention;

FIG. 12C is a cross sectional view taken along line A-A of FIG. 12A in accordance with the invention;

FIG. 12D is a perspective view of an alternative embodiment of a linking bar in accordance with the invention;

FIG. 12E is a side elevation view of the alternative embodiment of the linking bar of FIG. 12D in accordance with the invention;

DETAILED DESCRIPTION OF THE INVENTION

Figure 1:
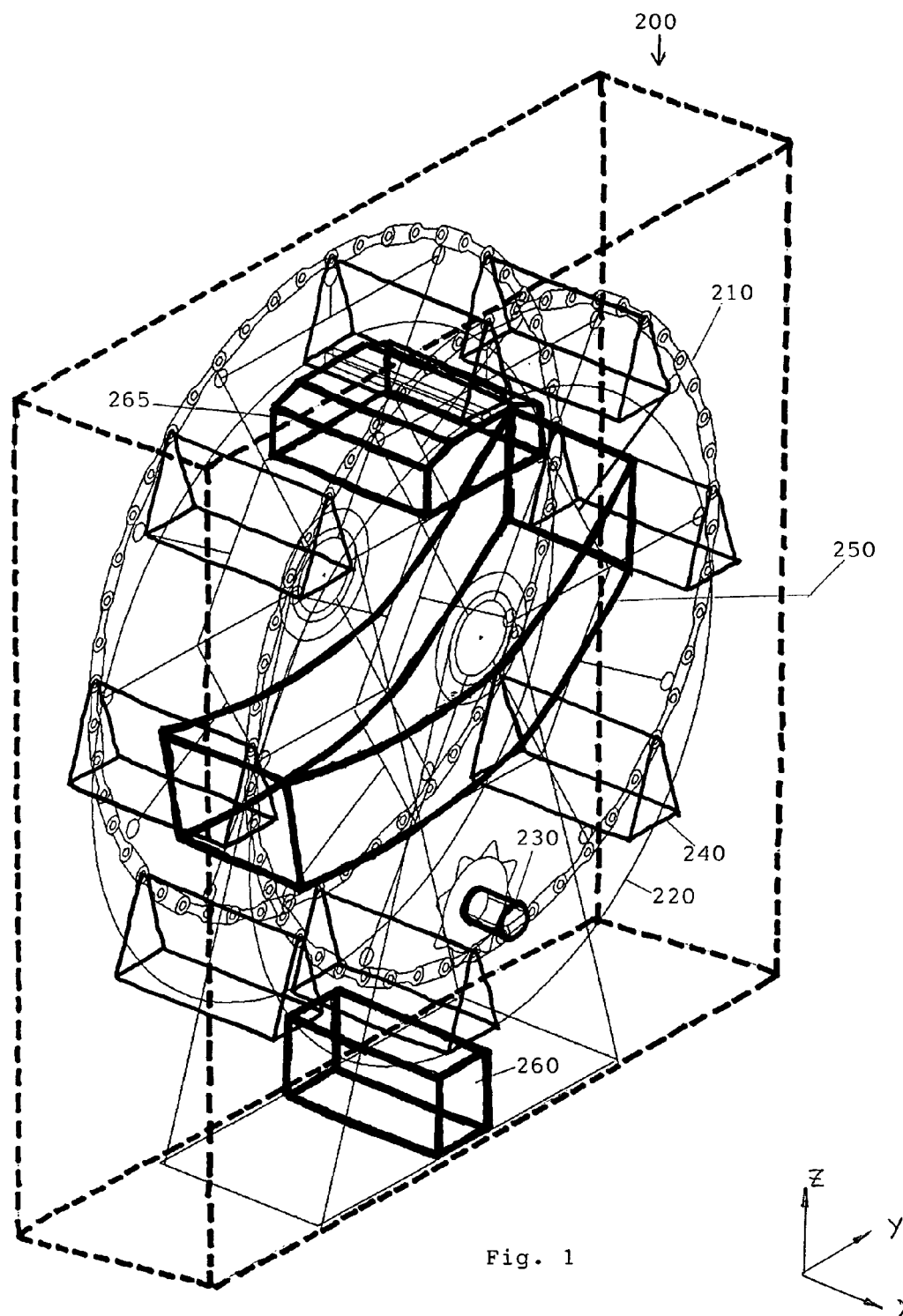
FIG. 1 shows a perspective view of a furnace implemented with one pair of rotating chains and one pair of fixed rings in accordance with the invention.
Figure 2:
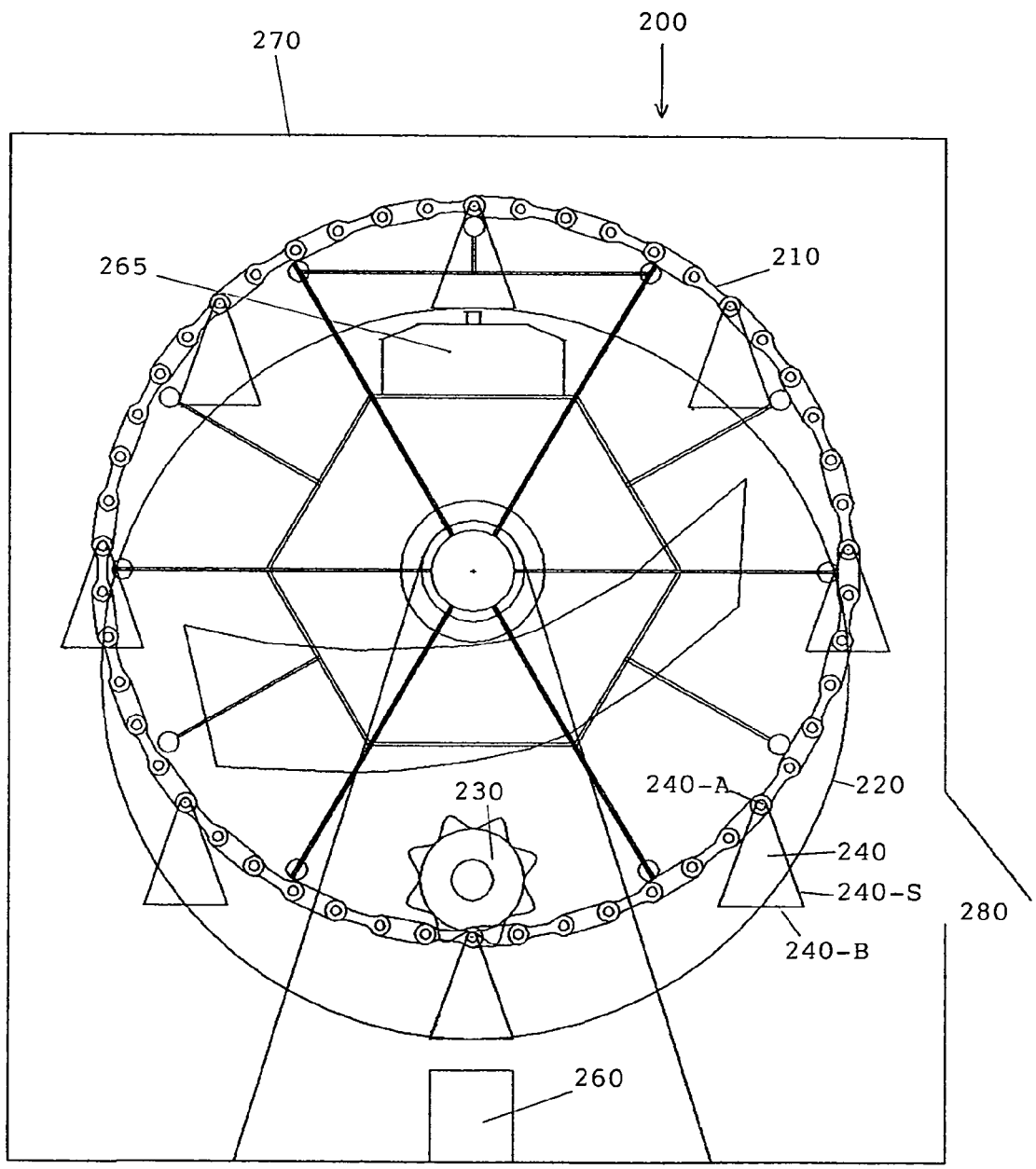
FIG. 2 shows a front elevation view of the furnace of FIG. 1 in accordance with the invention.

Referring to FIG. 1 and FIG. 2 a furnace 200 includes a pair of chains 210 and a pair of rings 220 disposed below the pair of chains 210. A motor 230 having a gearbox is engaged to one chain or both chains to drive the pair of chains to rotate while the pairs of rings 220 are kept stationary. The pair of rings 220 are separated by a desired distance to provide an open space within the furnace 200 to accommodate the pair of chains 210 whose central portion is coupled to a rotary driver mechanism powered by the motor 230. Furthermore, the axis line comprising the two fixed ring geometric centers are parallel and vertically below the axis line comprising the two rotating chain geometric centers.

A plurality of trays 240 include a horizontal bottom plate 240-B and side panels 240-S with top apex 240-A having two hanging points attached and hung on the chains 210. The bottom plate 240-B is engaged and restrained along the pair of rings 220 to assure that the horizontal bottom plate 240-B is continuously maintained horizontally as the pairs of chains 210 carry the trays 240 along a rotational trajectory. The trays 240 are engaged between the pairs of rotational chains 210 and the stationary rings 220 employing a four bar linkage mechanism such that the bottom plate 240-B can always orient along a horizontal plane to carry objects to undergo process cycles. Special arrangements are made between the chains 210 to rings 220 on each side with an offset at a defined space so a drive bar can be used to connect with both units without any interference during cycle rotation. The furnace 200 further includes a heat exchanger 250 for controlling the temperature of the furnace. A flux foam pot 260 is disposed on a bottom of the furnace for carrying out flux coating on the bottom side of PCB boards. A wave-soldering unit 265 is placed on a top portion of the furnace.

Referring to FIG. 2, the furnace 200 is enclosed in a housing 270 with a loading/unloading opening 280 for loading the objects for heating/cooling onto the trays 240 and to remove the objects after the heating/cooling processes are completed. The housing 270 includes a top portion removable from a bottom portion. The rotating mechanism implemented by the motor 230 and the pair of chains 210 rotates the objects for heating placed onto the trays 240 from a cold zone disposed at a fourth quadrant range, i.e., at a lower portion of the enclosure housing 270 to a hot zone disposed on an upper portion of the enclosure housing 270 for carrying out the heating processes on the objects. The motor 230 can be controlled to rotate the objects between the cold zone and the hot zone alternatively to do soldering reflow and wave soldering in the hot zone and solidifying the solder material between the leads/pins and the pads/holes of electronic parts in the cold zone.

Figure 3:
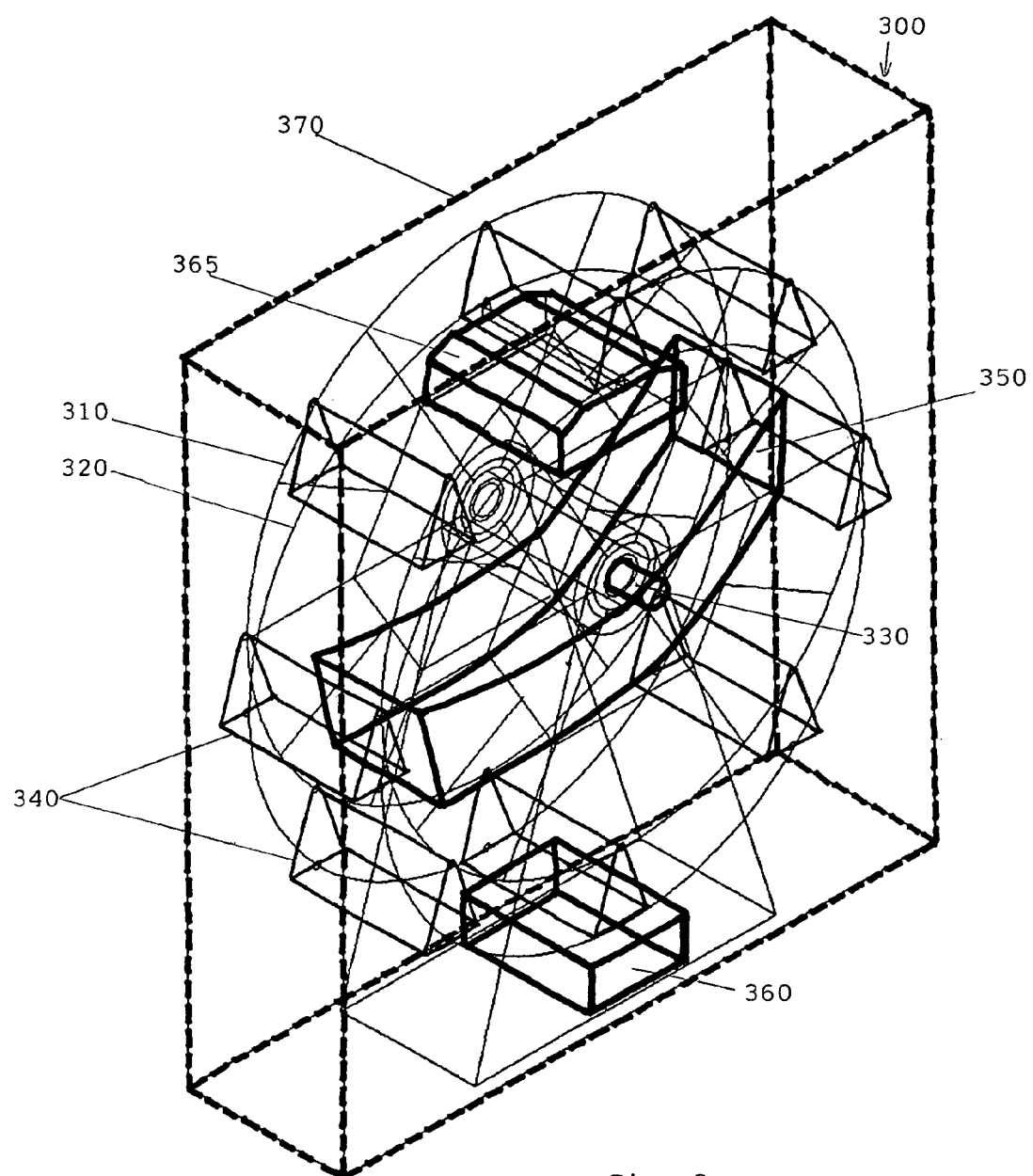
FIG. 3 shows a perspective view of a furnace implemented with one pair of rotating rings and one pair of fixed rings in accordance with the invention.
Figure 3:
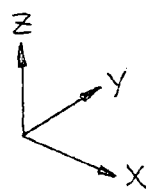

In FIG. 1, FIG. 2, and FIG. 3, the heavy continuous lines represent special function modules including soldering pots, flux foam generators and heat exchangers. The heavy dashed lines represent the furnace housing. The continuous lines represent the trays. The fine continuous lines represent the skeleton structure of the furnace including the rings and chains. The heating units are not shown in the drawings but one of ordinary skill in the art will appreciate that such heating units are needed to implement a plurality of specific applications.

The furnace 200 of the invention provides a furnace operable to perform both heating and cooling in a single processing cycle carried out at different locations inside a confined rotating volume within the enclosure housing 270. A simple partition is achieved by natural convection and enhanced by the tray movement acting as a propeller. Fewer heating units are disposed along the tray movement path so the furnace temperature profile can be set for infinitesimal heating change or for a rapid heating change.

The installation of the heat exchanger 250 diverts unnecessary heat from the furnace first quadrant to the third quadrant for preheat purposes. This makes the cooling process easier in the first quadrant.

In a preferred embodiment, the furnace 200 is provided with a plurality of radially extending beams with one end connected to a small inner circle that is attached to a furnace wall and the other end, generally referred to as an external point, for supporting rotation of the chain 210. These external points are also restrained by a cross bar installed between two nearby beams. The final shape of the support structure is preferably a spider web form.

The objects or work pieces are loaded onto the trays 240. The trays 240 have their apexes 240-A hingedly attached to the rotating chain 210 on the top ring pair and the base connected to the lower ring pair 220 via a sliding mechanism. This linkage can provide a stable and steady rotating movement of the trays 240 by restraining a middle point of the lateral sides of the base 240-B. For a PCB process, the performance of both the soldering reflow and wave soldering can be carried out in a single processing cycle as the trays 240 rotate in the hot zone and the solder solidification takes place as the trays 240 are rotated to the cool zone.

Another benefit of the furnace 200 is the smooth operation of the loading and unloading of the objects onto the trays 240 due to the rotational movement of the trays 240. Special mechanisms for automatically loading and unloading may be conveniently designed to comply with the rotational movement of the trays 240 to place and remove the objects to and from the trays 240 through the opening 280. Alternatively, an operation may place and remove the objects.

The furnace 200 develops a temperature gradient along the elevation of the furnace 200 and increases in the heating effect may be achieved by adding heating units along the tray movement path at intended areas. Heat can be kept in the upper quadrants to thereby reduce the energy consumption and use of inert gases of the furnace 200. For PCB soldering purposes, by employing the furnace 200, the drag material produced in the wave soldering oven can be reduced to a minimum level or even diminished to a level of zero when proper designs are implemented with inert gas or reduced atmosphere.

The furnace 200 can be used for a plurality of applications with the addition of required devices, equipment, and modules. The compact size and ease of operation of the furnace 200 allows the furnace 200 to be easily and conveniently built for operation in an office or small laboratory. The furnace 200 thus can be employed for applications such as medical, food processing, and any industrial applications that require heat processing.

Figure 4:
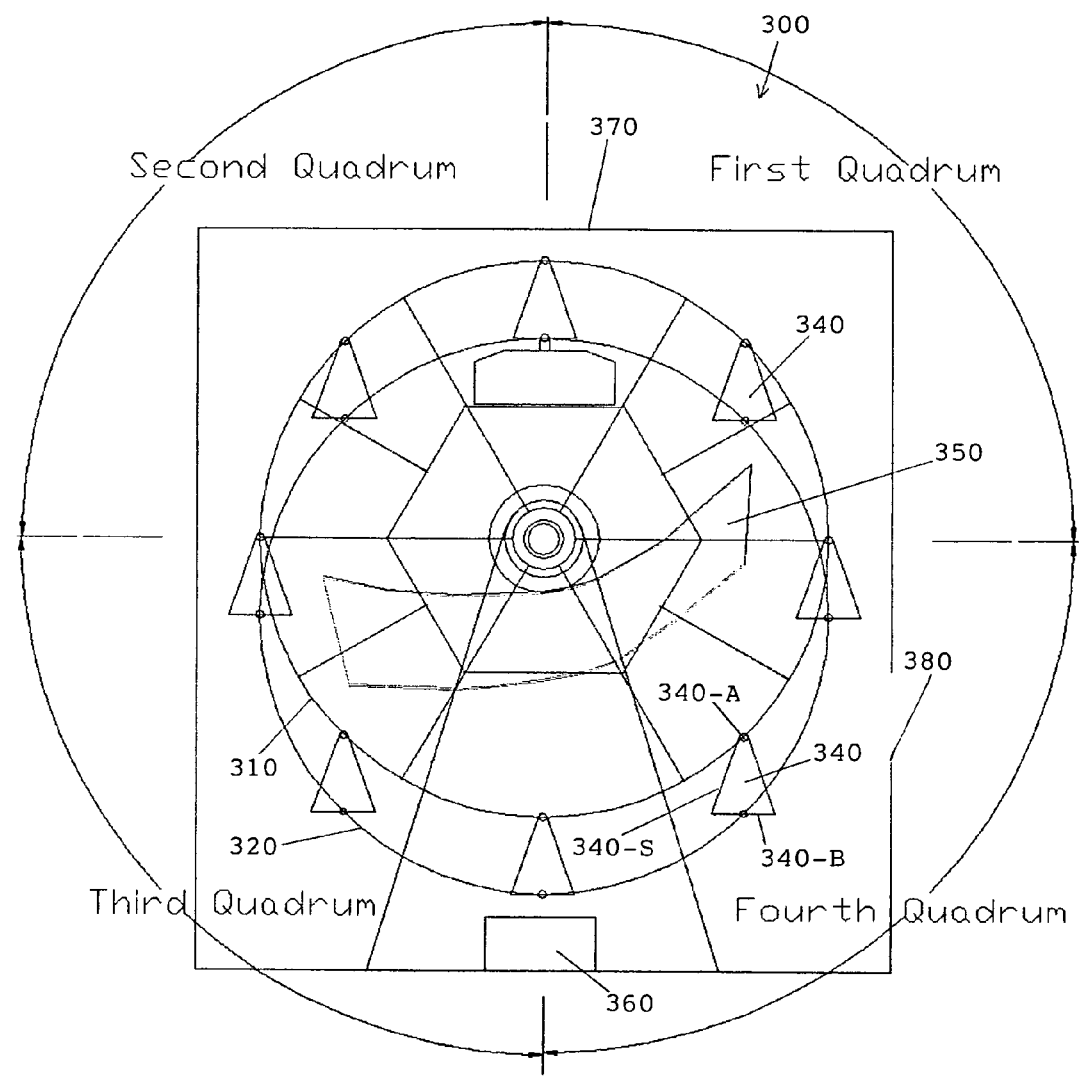
FIG. 4 shows a front elevation view of the furnace of FIG. 3 in accordance with the invention.

FIG. 3 and FIG. 4 show another embodiment of the invention including a furnace 300 having a pair of vertically rotating rings 310 and a pair of fixed rings 320. A motor 330 drives the pair of rotating rings 310. The pair of rotating rings 310 carry trays 340. The pair of fixed rings 320 are separated by a desired distance to provide an open space within the furnace 300 to accommodate the pair of rotating rings 310 whose central portion is coupled to a rotary driver mechanism powered by the motor 330. Furthermore, the axis line comprising the two fixed ring geometric centers are parallel and vertically below the axis line comprising the two rotating ring geometric centers.

The pair of fixed rings 320 keep the trays 340 in a vertical position when the trays 340 are rotated from the first quadrant through the fourth, third and second quadrants. Alternatively, the trays 340 may be rotated in a counter-clockwise direction through the first, second, third, and fourth quadrants.

The motor 330 includes a gearbox and is engaged to one or both rotating rings 310 to rotate the rotating rings 310 while the fixed rings 320 are stationary. A plurality of trays 340 include a horizontal bottom plate 340-B and side panels 340-S with a top apex 340-A having two hanging points attached and hung on the rotating rings 310. The bottom plate 340-B is slidingly engaged and restrained along the pair of fixed rings 320 to assure that the horizontal bottom plate 340-B is continuously maintained in a horizontal plane as the pairs of rotating rings 310 carry the trays 340 along a rotational trajectory. The trays 340 are engaged between the pairs of rotating rings 310 and the fixed rings 320 employing a four bar linkage mechanism such that the bottom plate 340-B can always orient itself along the horizontal plane to carry objects undergoing a process cycle. Special arrangements are made between the rotating rings 310 and the fixed rings 320 on each side with an offset at a defined space so a drive bar can be used to connect with both units without any interference during cycle rotation.

The furnace 300 further includes a heat exchanger 350 for controlling the temperature of the furnace 300. A flux foam pot 360 is disposed on a bottom of the furnace 300 for carrying out flux coating on the bottom side of a PCB. A wave-soldering unit 365 is disposed at a top portion of the furnace 300.

Figure 5:
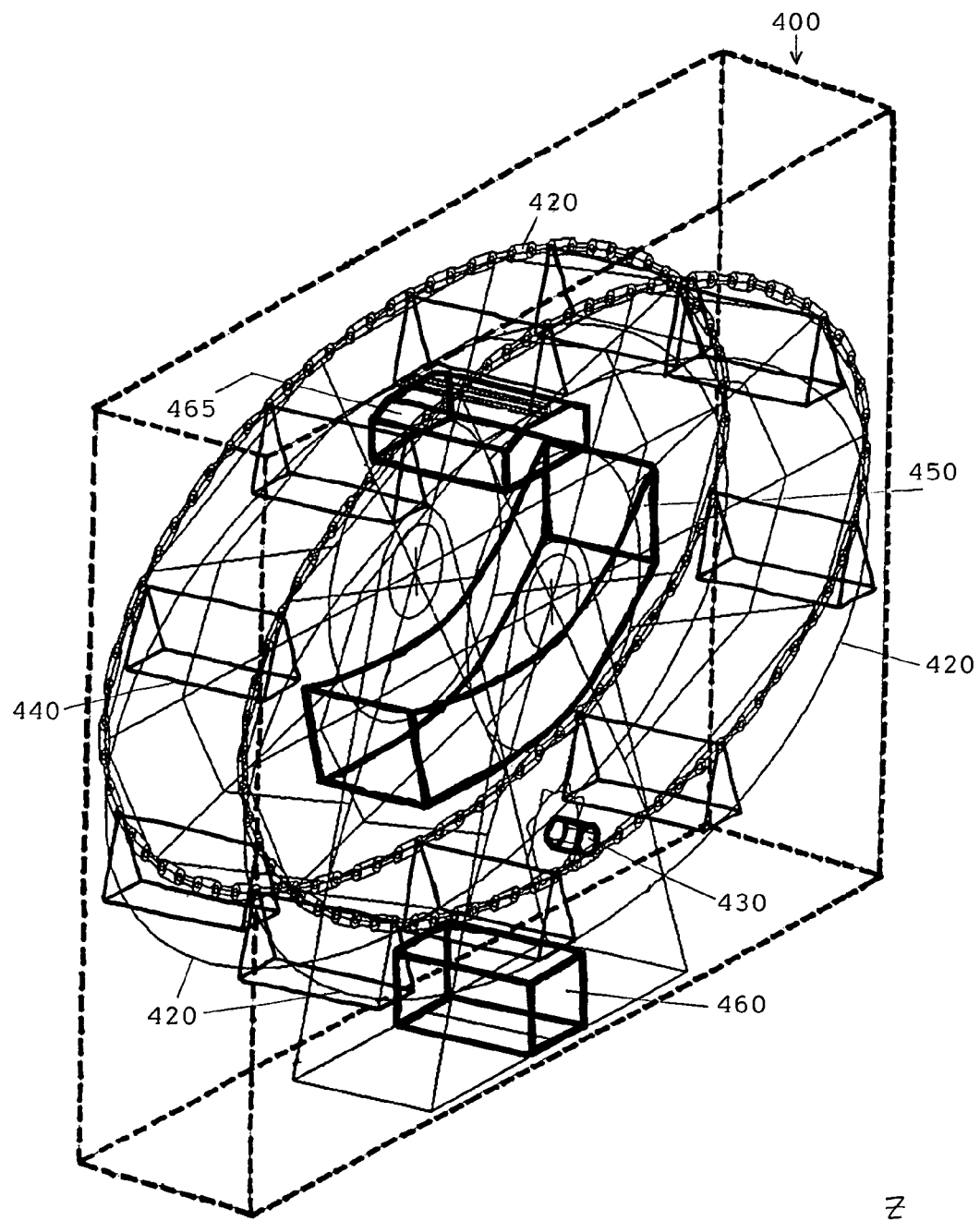
FIG. 5 shows a perspective view of a furnace implemented with one pair of rotating elliptical chains and one pair of fixed elliptical rings in accordance with the invention.
Figure 5:
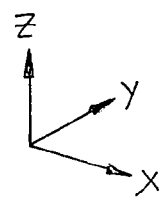
Figure 6:
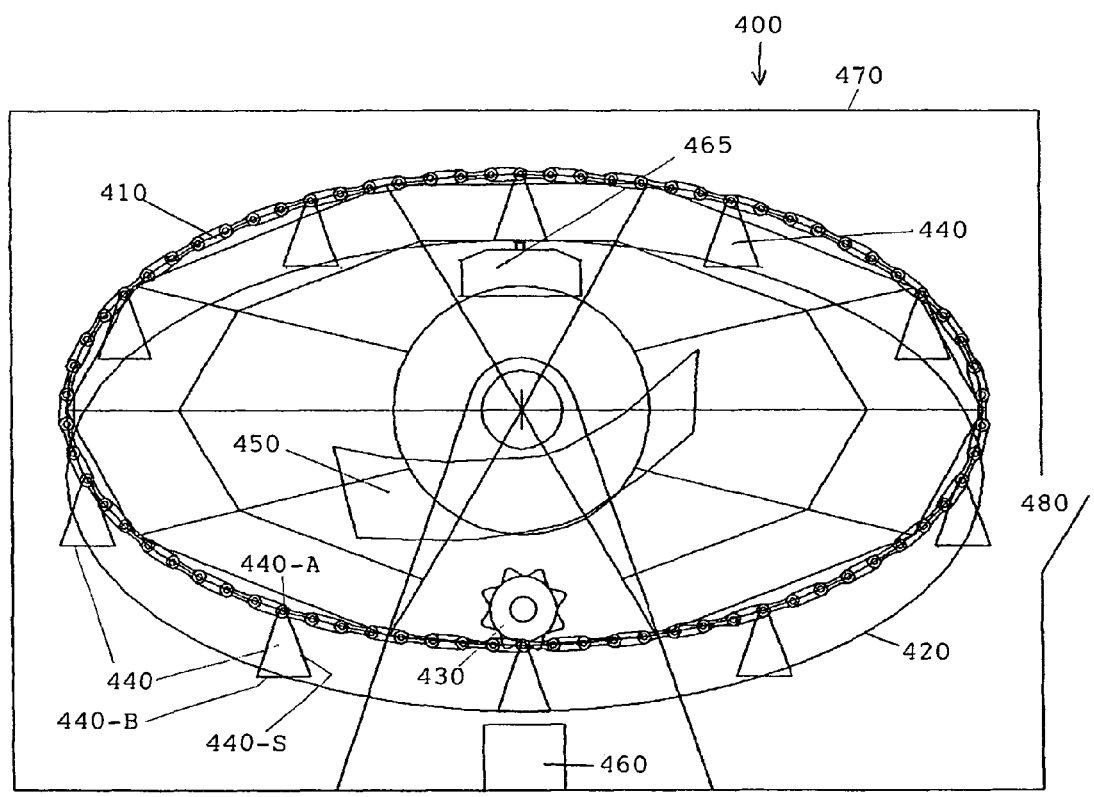
FIG. 6 shows a front view of the furnace of FIG. 5 in accordance with the invention.

FIG. 5 and FIG. 6 show another embodiment of the invention including a furnace 400 having vertically rotating elliptical chains 410 and a pair of fixed elliptical rings 420. The pair of rotating chains 410 is driven by a motor 430 and carries trays 440. A furnace housing 470 encloses the pair of rotating chains 410 and the fixed rings 420. The pair of rotating chains carries the trays 440 while bottom portions of the trays 440 are slidingly attached to the pair of fixed rings 420. This configuration keeps the trays 440 in a vertical orientation when the trays 440 are rotated with the pair of rotating chains 410 along a vertically ellipse-shaped trajectory.

The motor 430 includes a gearbox engaged to one or both or the rotating chains 410 to drive the pair of rotating chains 410 to rotate while the pairs of fixed rings 420 are kept stationary. A plurality of trays 440 include a horizontal bottom plate 440-B and side panels 440-S with a top apex 440-A having two hanging points attached and hung on the rotating rings 410. The bottom plate 440-B is slidingly engaged and restrained along the pair of fixed rings 420 to assure that the horizontal bottom plate 440-B is continuously maintained in a horizontal plane as the pairs of rotating rings 410 carry the trays 440 along an elliptical rotational trajectory. The trays 440 are engaged between the pairs of rotating rings 410 and the fixed rings 420 employing a four bar linkage mechanism such that the bottom plate 440-B can always orient itself along the horizontal plane to carry objects undergoing a process cycle. Special arrangements are made between the rotating rings 410 and the fixed rings 420 on each side with an offset at a defined space so a drive bar can be used to connect with both units without any interference during cycle rotation.

The furnace 400 includes a heat exchanger 450 for controlling the temperature of the furnace 400. A flux foam pot 460 is disposed on a bottom of the furnace 400 for carrying out flux coating on the bottom side of a PCB. A wave-soldering unit 465 is disposed in a top portion of the furnace 400.

Figure 7:
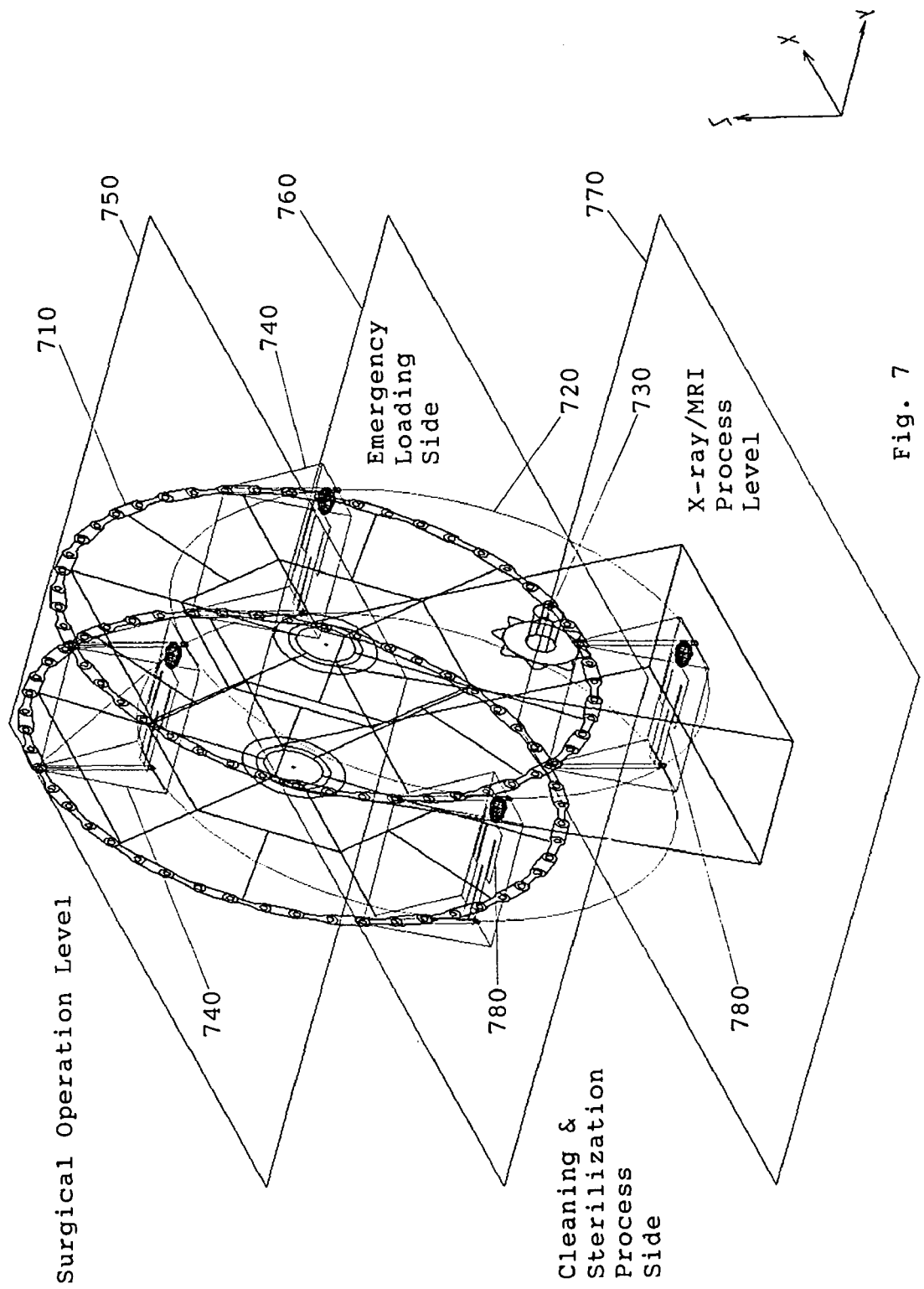
FIG. 7 shows a perspective view of a vertical rotational system disposed across three levels of a hospital in accordance with the invention.
Figure 8:
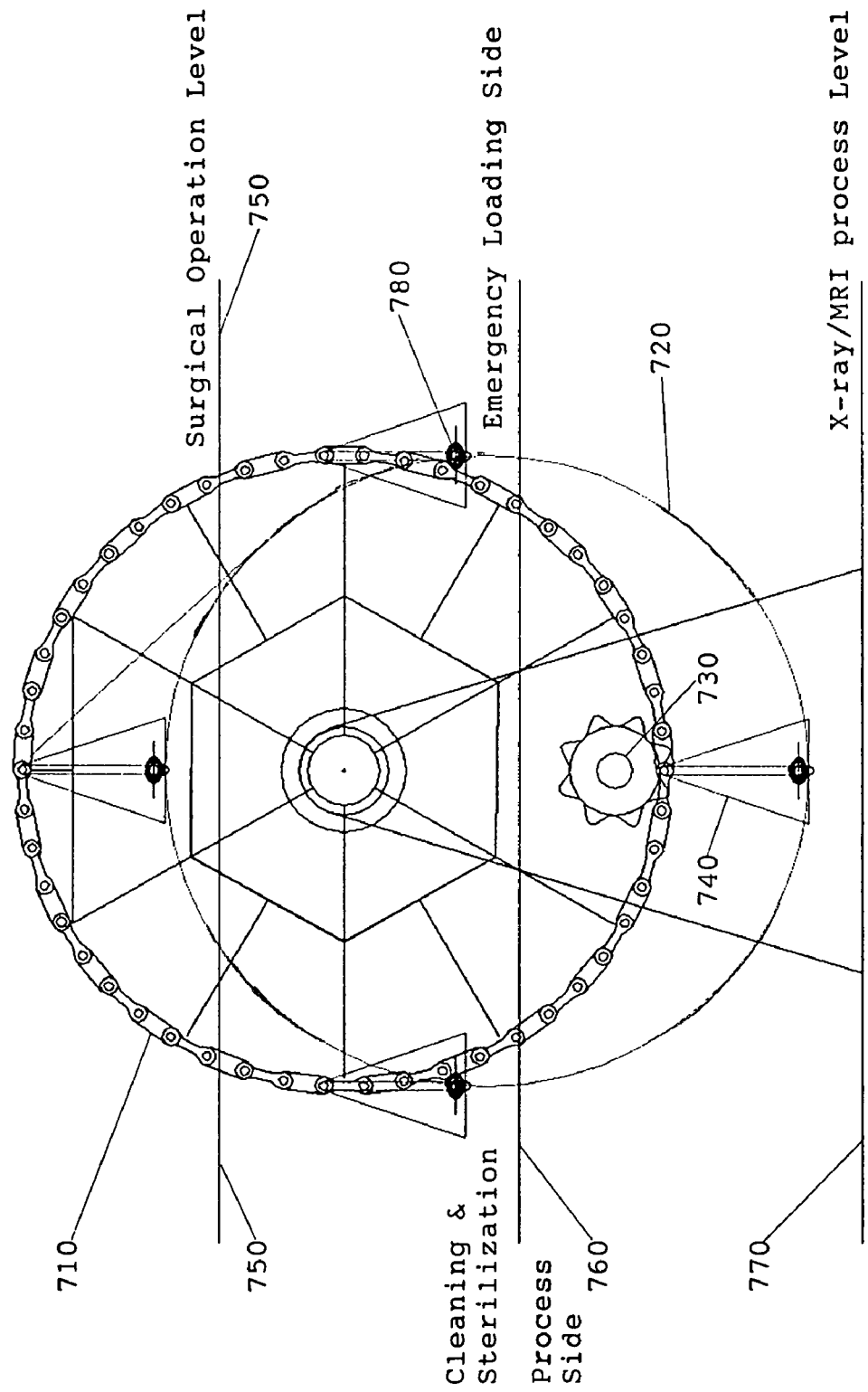
FIG. 8 is a side elevation view of the vertical rotational system of FIG. 7 in accordance with the invention.

With reference to FIG. 7 and FIG. 8, a vertical rotating structure in accordance with the invention can be implemented with different functional modules to perform special processes such a patient handling inside a hospital. The hospital comprises three levels, a basement level 770, a ground level 760, and a second floor level 750. The vertical rotating structure includes a pair of rotating chains 710 and a pair of fixed rings 720. The pair of rotating chains 710 and the pair of fixed rings 720 may be circular or elliptical. A motor 730 is operably engaged to one or both rotating chains 710. A plurality of trays 740 couple the rotating chains 710 to the fixed rings 720 as in previously described embodiments. The trays 740 may include beds.

A patient 780 may be placed on a tray 740 in an emergency loading side of the ground level 760 and prepared for subsequent processes. The rotating chains 710 may then be rotated to position the tray including the patient 780 in an X-ray/MRI station on the basement level 770. After receiving an X-ray or MRI, the tray 740 may be rotated to a cleaning and sterilization station on the ground floor 760. Following a cleaning and sterilization process the tray 740 may be rotated to a surgical station on the second floor 750. It can be seen that the patient does not have to be moved from his bed during the performance of the various processes. This is especially advantageous for patients with spinal chord injuries. Furthermore, if the X-ray and MRI do not show an injury requiring surgery, the patient may be removed from the tray 740 at the cleaning and sterilization station on the ground level 750.

In another aspect of the invention, the patient may be substituted with an automobile in an automobile repair station, a plant in a greenhouse, and a drug or chemical in a biotechnology facility. Each of three levels may be utilized for various purposes requiring particular conditions such as environmental conditions.

Figure 9:
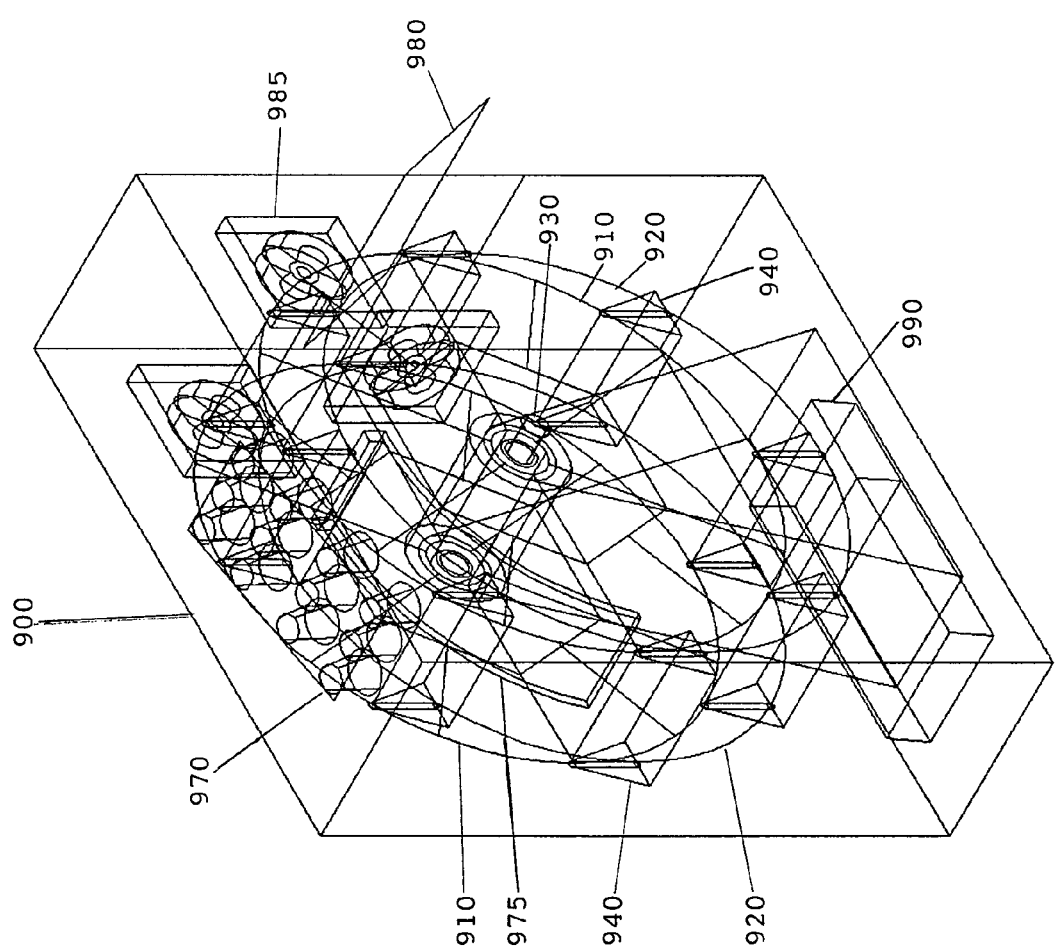
FIG. 9 shows a perspective view of a furnace implemented with one pair of rotating rings and one pair of fixed rings operable to implement a cleaning system in accordance with the invention.
Figure 10:
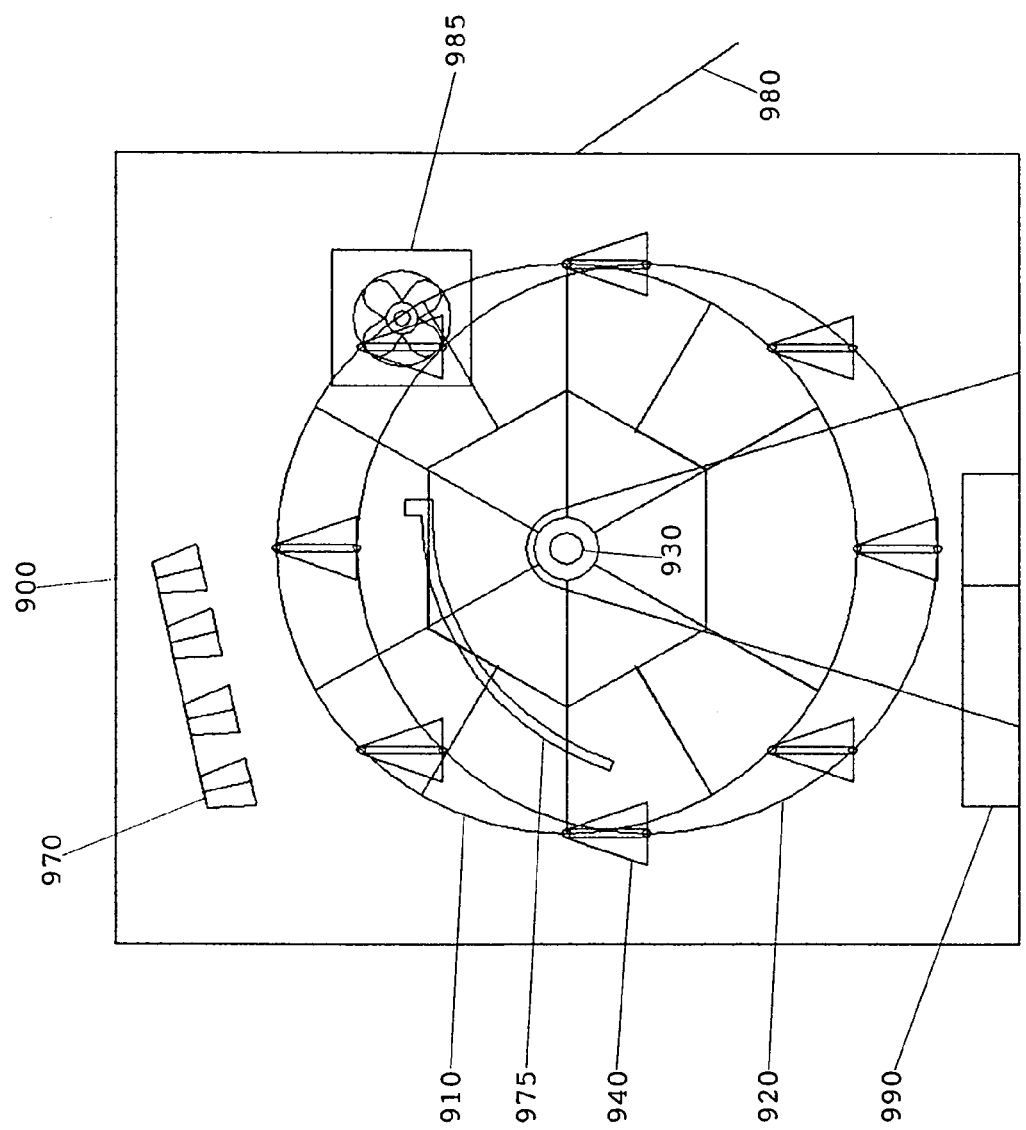
FIG. 10 is a side elevation view of the furnace of FIG. 9 in accordance with the invention.

A cleaning system for washing printed circuit boards is shown in FIG. 9 and FIG. 10. A pair of rotating rings 910 and a pair of fixed rings 920 are disposed within a housing 900. A motor 930 is operatively engaged to the rotating rings 910 and a plurality of trays 940 are linked to the rotating rings 910 and the fixed rings 920 as previously described. An array of spray nozzles 970 is disposed in an upper portion of the housing 900. The sprayed material, which may include water, is gathered by a collector 975 formed of sheet metal and disposed under the array of spray nozzles 970 in such manner that the material sprayed is directed to a collection tank 990 after being used to spray printed circuit boards disposed on the trays 940. A door 980 provides for loading/unloading of the printed circuit boards onto the trays 940. The door 980 may be disposed in any place convenient for the loading/unloading of the trays 940 including a top portion of the housing 900. A plurality of dryer fans 985 are disposed in the housing to dry the printed circuit boards as they pass between and near the dryer fans 985.

The collection tank 990 may include two sections. One section may collect water from the collector 975 and another section may filter, ionize balance and chemically neutralize the collected water for reuse by the spray nozzles 990.

Figure 11:
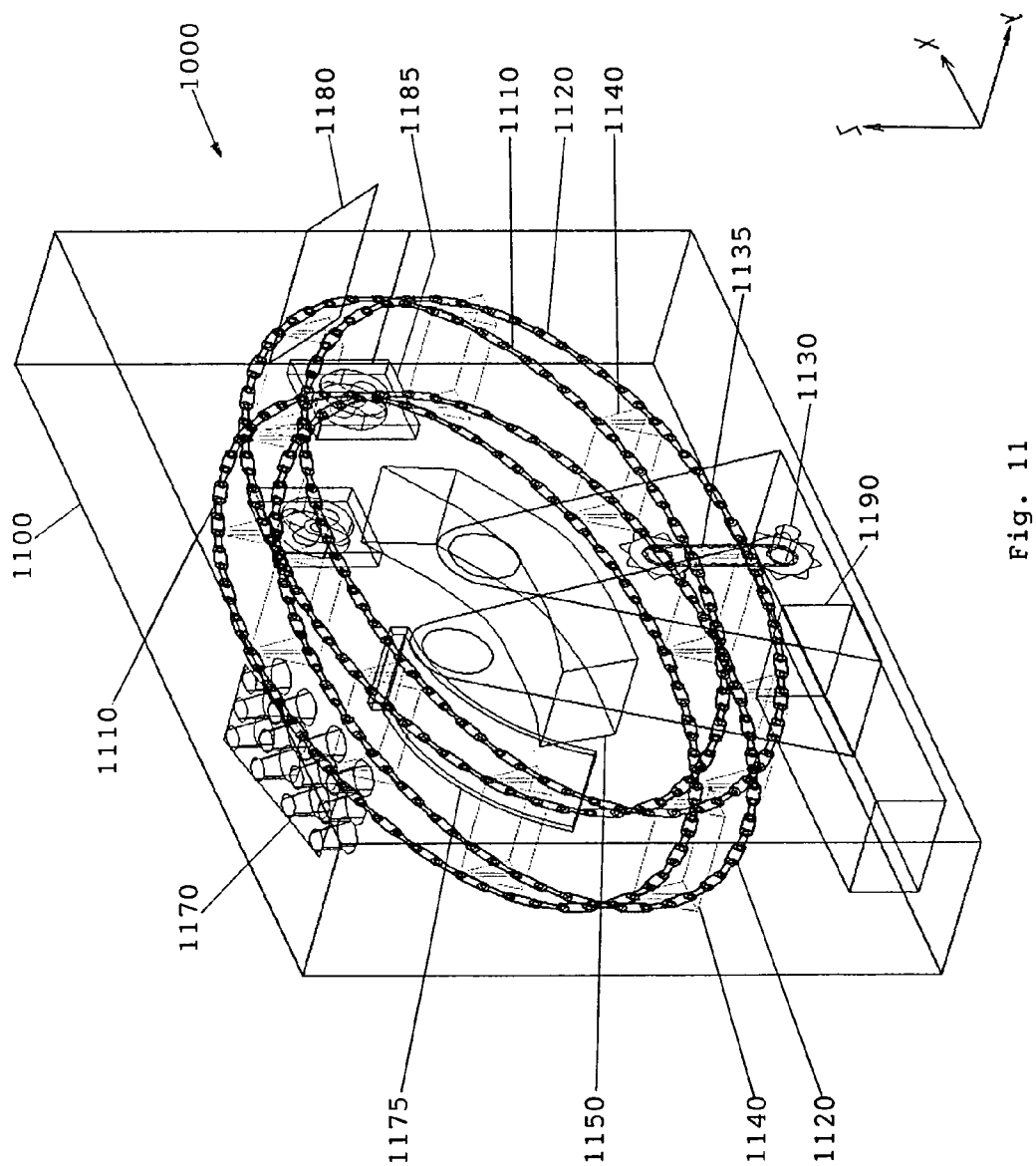
FIG. 11 is a perspective view of a vertical rotational system implemented with two elliptical pairs of rotating chains in accordance with the invention.
Figure 12:
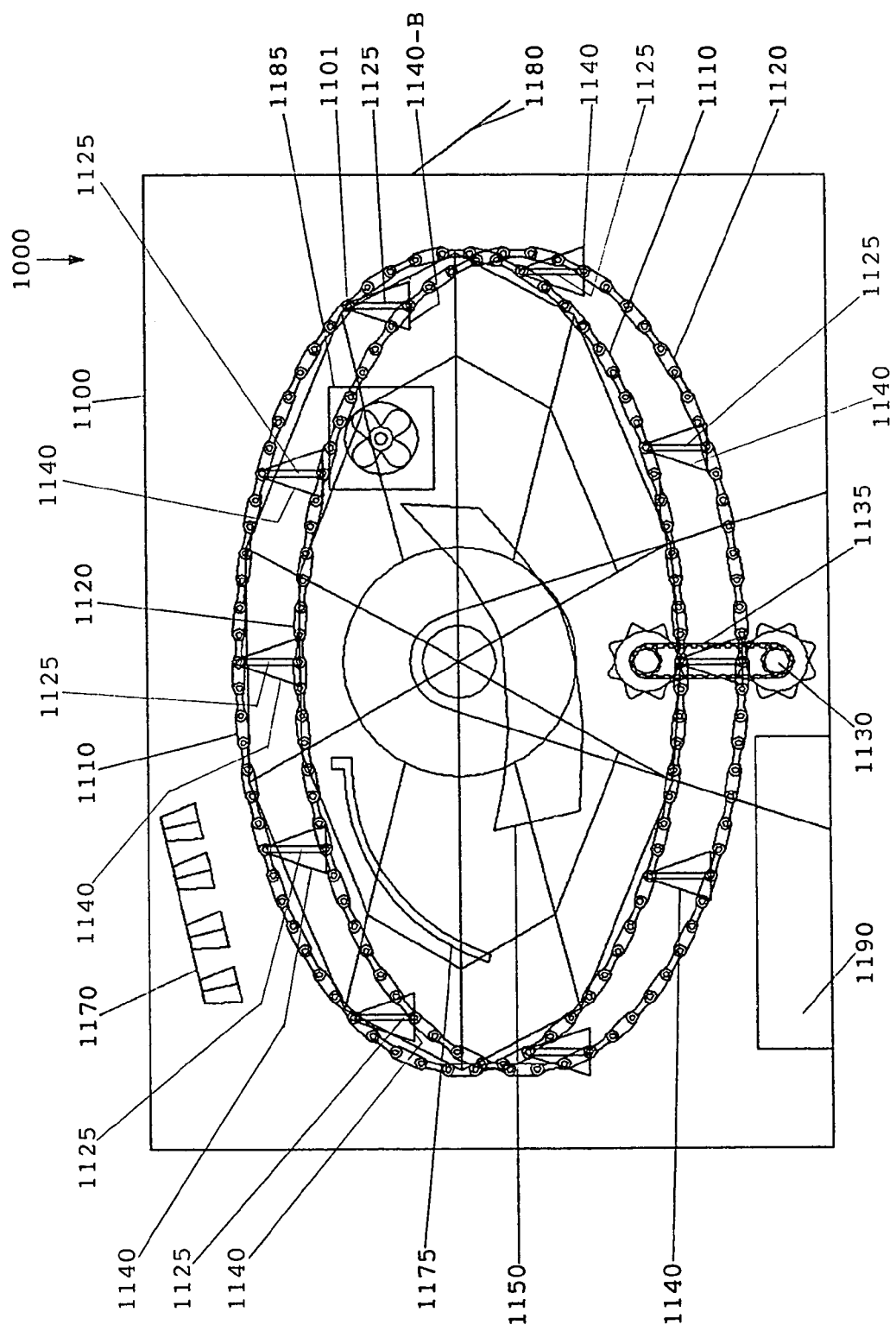
FIG. 12 is a side elevation view of the vertical rotational system of FIG. 11 in accordance with the invention.

With reference to FIG. 11 and FIG. 12, an apparatus 1000 for carrying a plurality of hanging trays 1140 includes a vertical rotating means having a pair of driving chains 1110 and a pair of driven chains 1120 housed in a housing 1100. The pair of driving chains 1110 and the pair of driven chains 1120 are coupled using a timing belt or chain 1135 and a plurality of linking bars 1125. Each of the linking bars 1125 extends between each driving chain 1110 and its respective driven chain 1120 at spaced locations corresponding to the locations of the trays 1140.

As shown in FIGS. 12A and 12B, each tray 1140 includes a top bar 1101, side portions 1140-S and a base portion 1140-B. Side portions 1140-S connect the top bar 1101 to the base portion 1140-B. Each top bar 1101 includes an inner portion 1103 slidingly received within hollow outer portions 1105. A spring 1107 is disposed over the inner portion 1103 and held between the outer portions 1105 to maintain the spacing between the outer portions 1105 during oven operation. The inner portion 1103 is sized and configured to provide support to the spring 1107 and to slide within the outer portions 1105 without constraining the movement of the outer portions 1105 relative to each other.

Linking bars 1125 are shown fixedly connected to the top bar 1101 at ends thereof distally of the connection between the side portions 1140-S and the top bar 1101 and through respective driving chains 1110. To maintain the trays 1140 in an upright orientation during rotation of the driving chains 1110, the driven chain 1120 is pivotally connected to each linking bar 1125 distally of its connection to each top bar 1101 as shown in FIG. 12C. A chain pin 1121 is shown rotatably coupled to the linking bar 1125 such that rotation of the driven chain 1120 maintains the linking bar 1125 in a substantially vertical orientation relative to a plane of the tray bottom portion 1140-B. Bearings (not shown) may be used to rotatably couple the chain pin 1121 to the linking bar 1125.

The linking bar 1125 shown in FIGS. 12A and 12B includes a solid piece of material. Alternatively, and as shown in FIGS. 12D and 12E, a linking bar 1127 includes an inner portion 1129a slidingly received within hollow outer portions 1129b. A spring 1133 is disposed over the inner portion 1129a and held between the outer portions 1129b to maintain the spacing between the outer portions 1129b during oven operation. The inner portion 1129a is sized and configured to provide support to the spring 1133 and to slide within the outer portions 1129b without constraining the movement of the outer portions 1129b relative to each other. Linking bar 1127 is thus operable to expand and contract during operation of the apparatus 1000.

Linking bars 1125 and 1127 extending between the driving chains 1110 and the driven chains 1120 provide for smoother rotation of trays 1140 and provide for increased synchronization between the driving and driven chains 1110 and 1120. A motor 1130 may include a stepper motor for precise positioning of the trays 1140 within the housing 1100. In addition to an array of spray nozzles 1170, a collector 1175, a loading/unloading door 1180, a collection tank 1190, and a plurality of dryer fans 1185, the apparatus 1000 includes a heat exchanger 1150 for distributing heat within the housing 1100.

Figure 13:
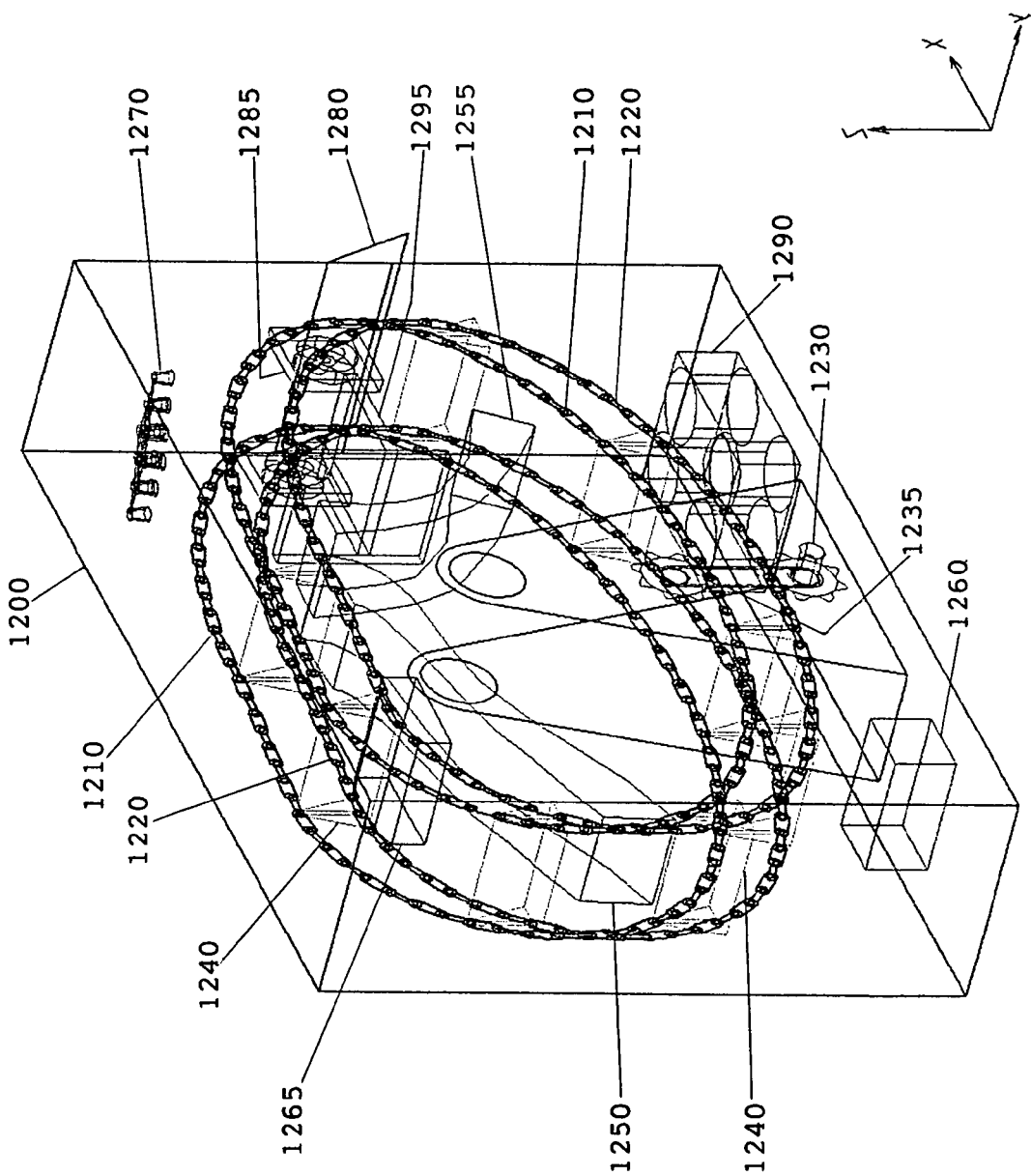
FIG. 13 is a perspective view of a furnace implemented with two pairs of elliptical rotating chains to implement a PCB process including a cleaning process in accordance with the invention.
Figure 14:
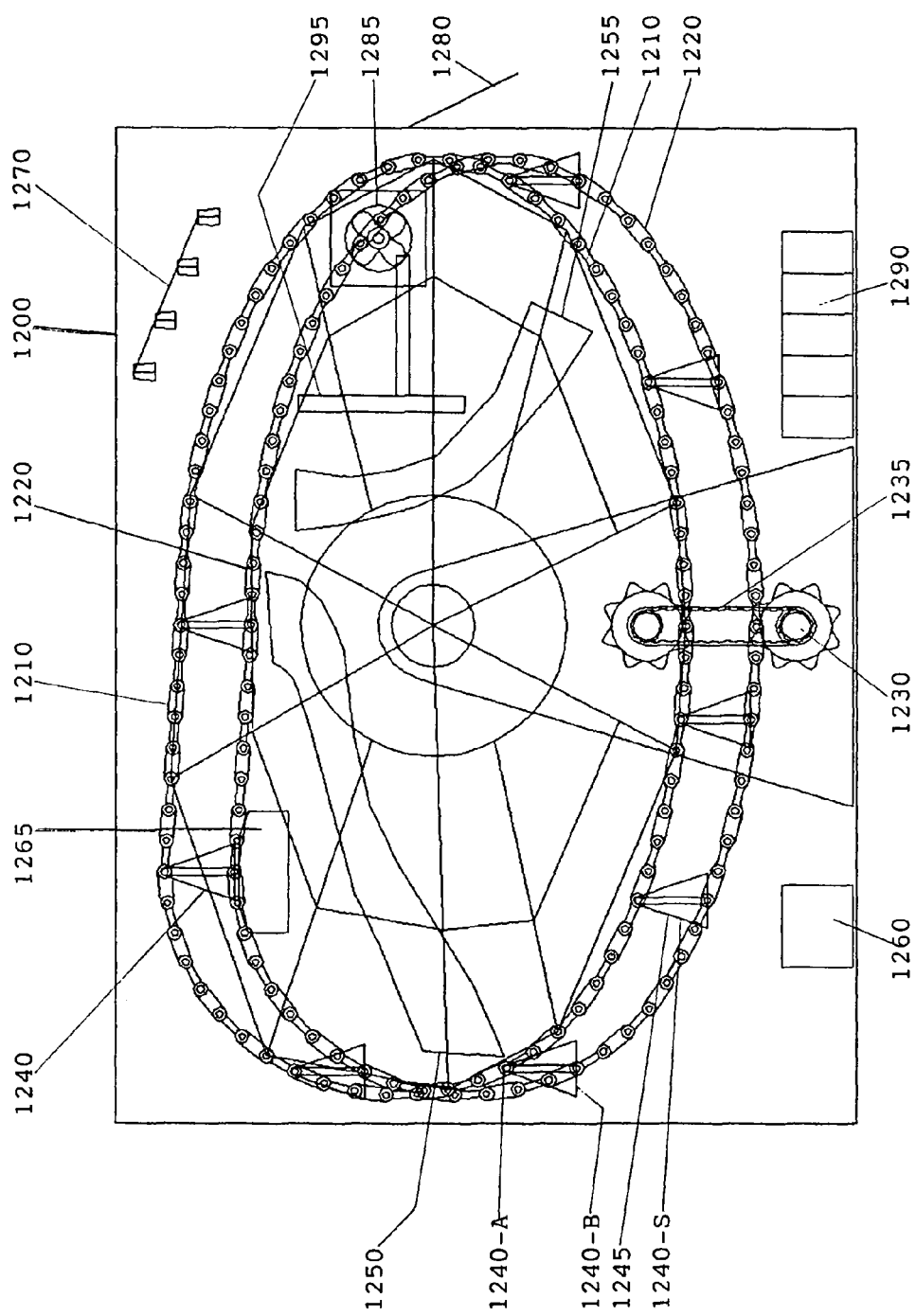
FIG. 14 is a side elevation view of the furnace of FIG. 13 in accordance with the invention.

As shown in FIG. 13 and FIG. 14, a housing 1200 includes a pair of irregularly shaped driving chains 1210 and a pair of irregularly shaped synchronized driven chains 1220 coupled together by means of a timing chain or belt 1235. A motor 1230 is coupled to the pair of driving chains 1210. A plurality of trays 1240 are coupled to the pair of driving chains 1210 and the pair of synchronized driven chains 1220 as previously described with respect to apparatus 1000. Linking bars 1245 extend between the driving chains 1210 and the synchronized driven chains 1220. The housing includes a first heat exchanger 1250 and a second heat exchanger 1255, an array of nozzles 1270 disposed in an upper corner of the housing 1200, and a collector 1290 disposed under the array of nozzles 1270 for directing liquid into a collection tank 1290. The housing further includes a flux foaming unit 1260 disposed on a bottom of the housing 1200, a solder pot 1265 disposed in an upper corner of the housing 200 opposite the array of nozzles 1270, and a plurality of dryer fans 1285 for drying objects on the trays 1240. A printed circuit board process including fluxing and soldering and cleaning is achieved by this design.

Figure 15:
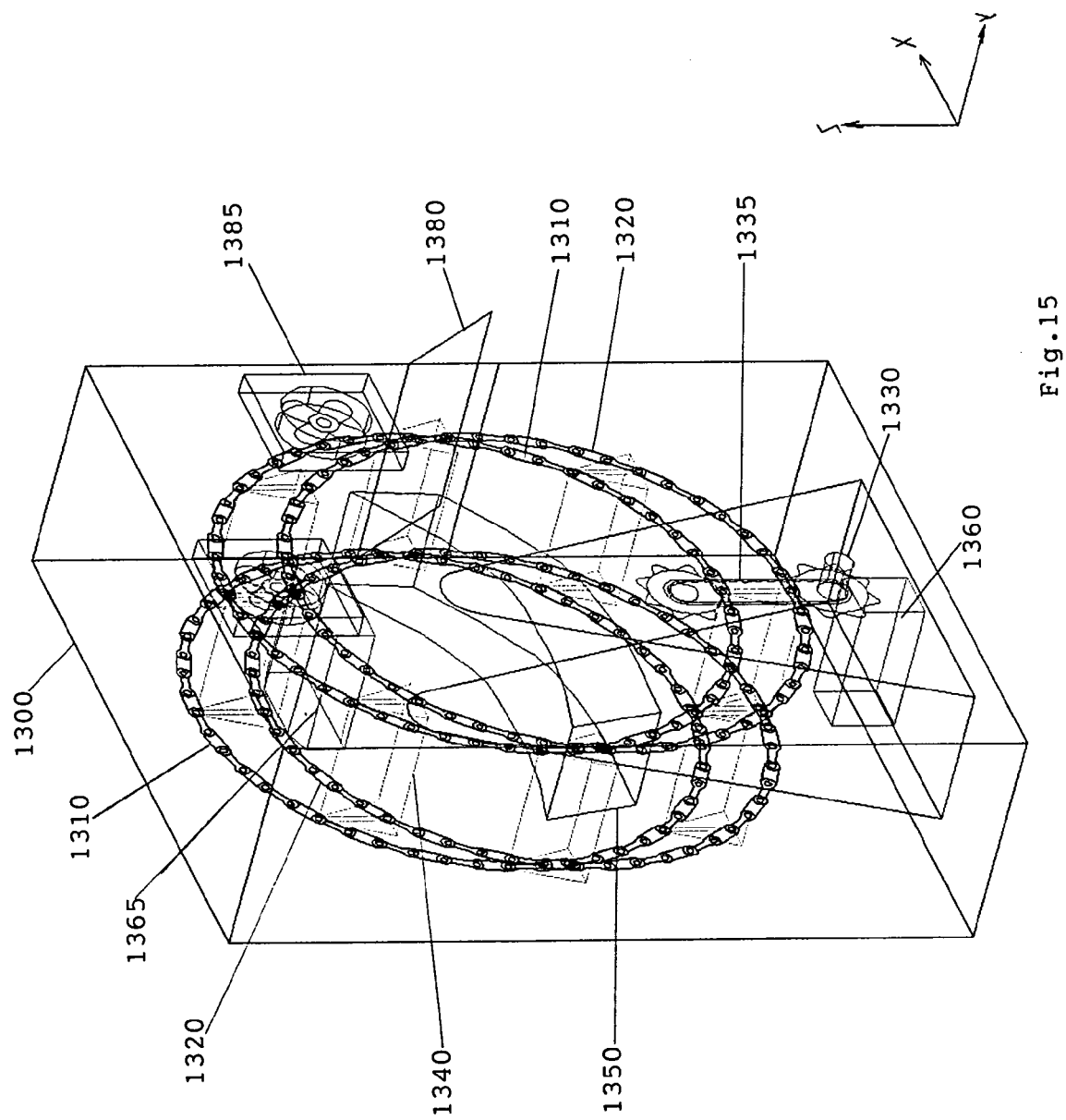
FIG. 15 is a perspective view of a furnace implemented with two pairs of circular rotating chains in accordance with the invention.
Figure 16:
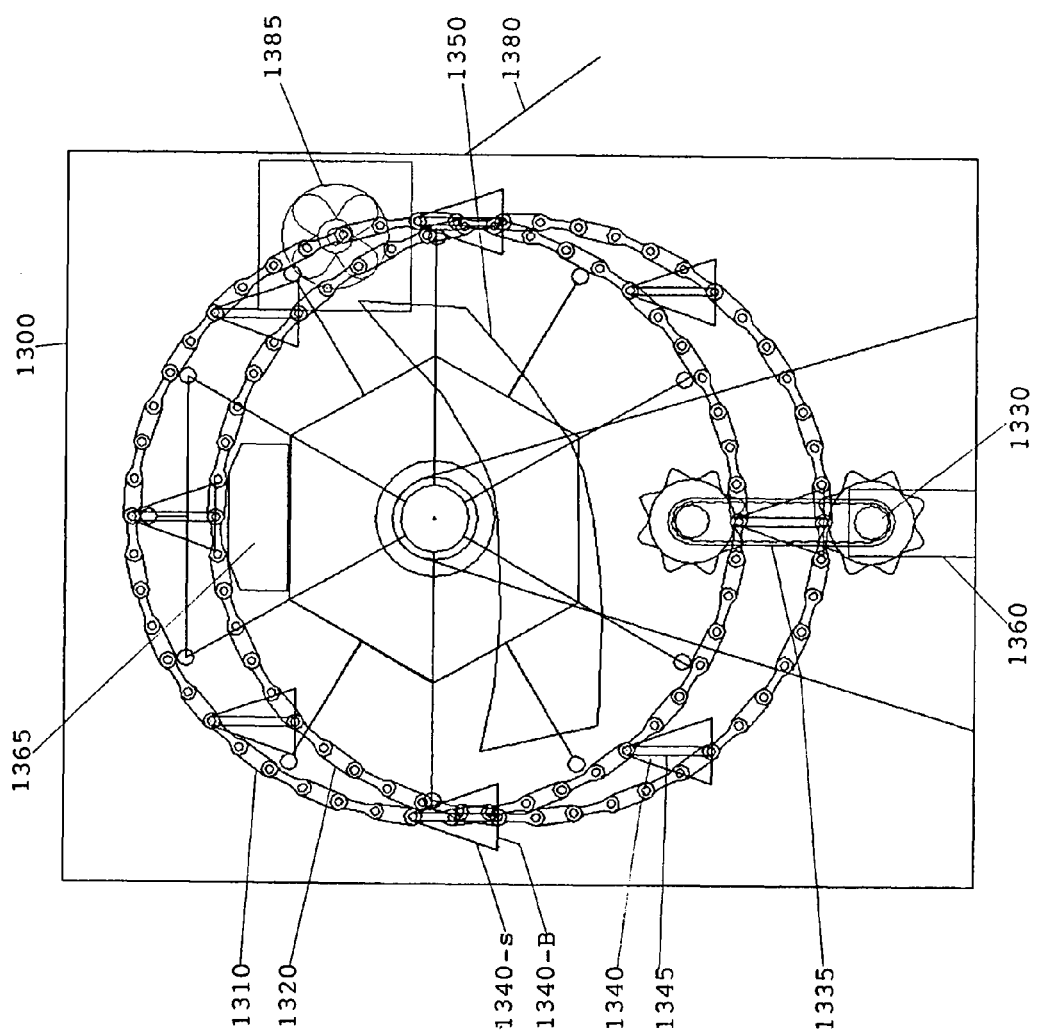
FIG. 16 is a side elevation view of the furnace of FIG. 15 in accordance with the invention.

With reference to FIG. 15 and FIG. 16, a furnace includes a housing 1300 having a pair of driving chains 1310 and a pair of synchronized driven chains 1320 coupled by means of a timing chain or belt 1335. A motor 1330 is coupled to the pair of driving chains 1310. The furnace also includes a heat exchanger 1350, a flux foaming unit 1360, a solder pot 1365 and a door for loading and unloading objects into and out of the furnace. The pair of driving chains 1310 and the pair of synchronized driven chains 1320 are of circular configuration.

Figure 17:
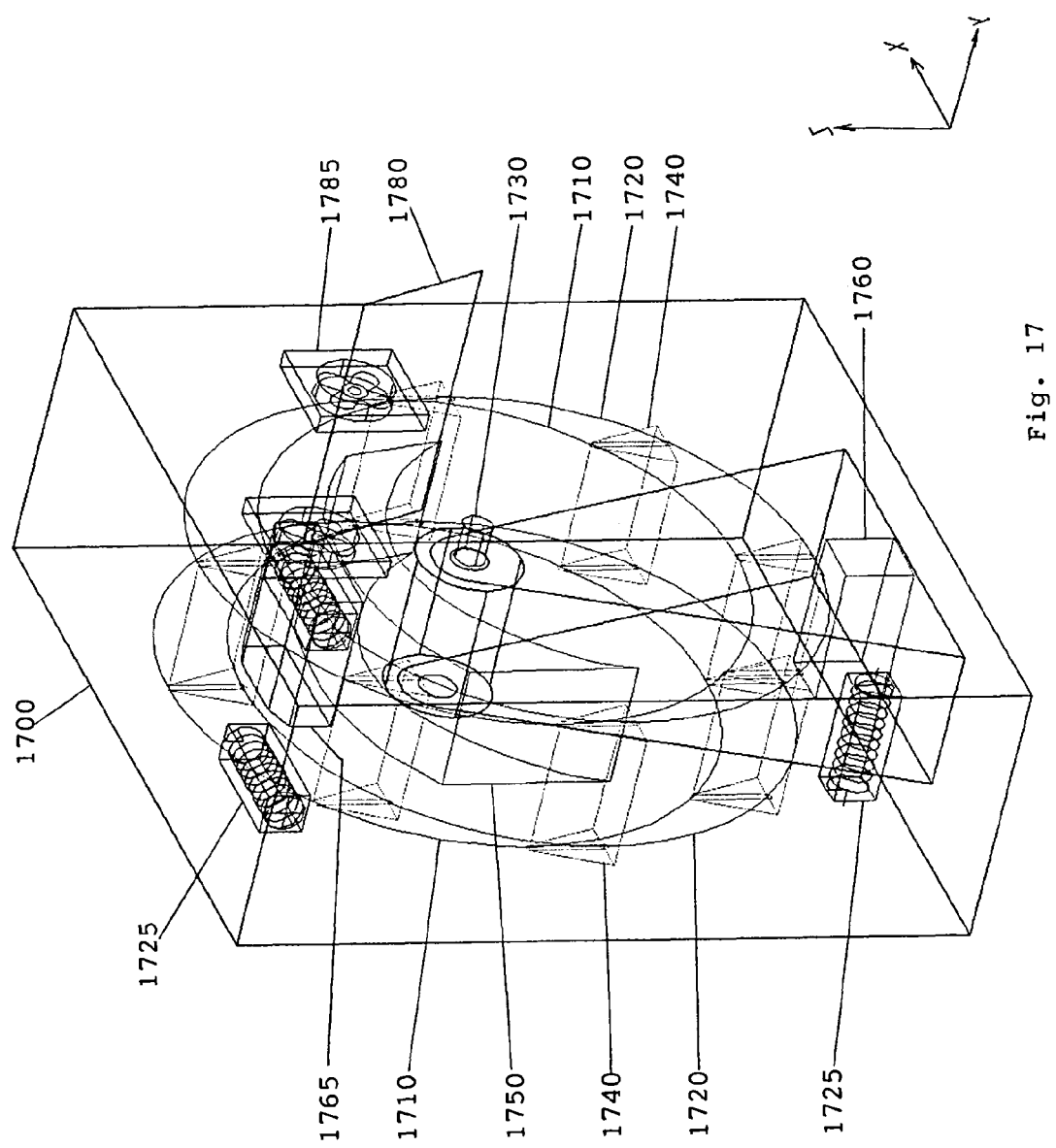
FIG. 17 is a perspective view of a furnace implemented with one pair of rotating rings and one pair of fixed rings including a heater and dryer in accordance with the invention.
Figure 18:
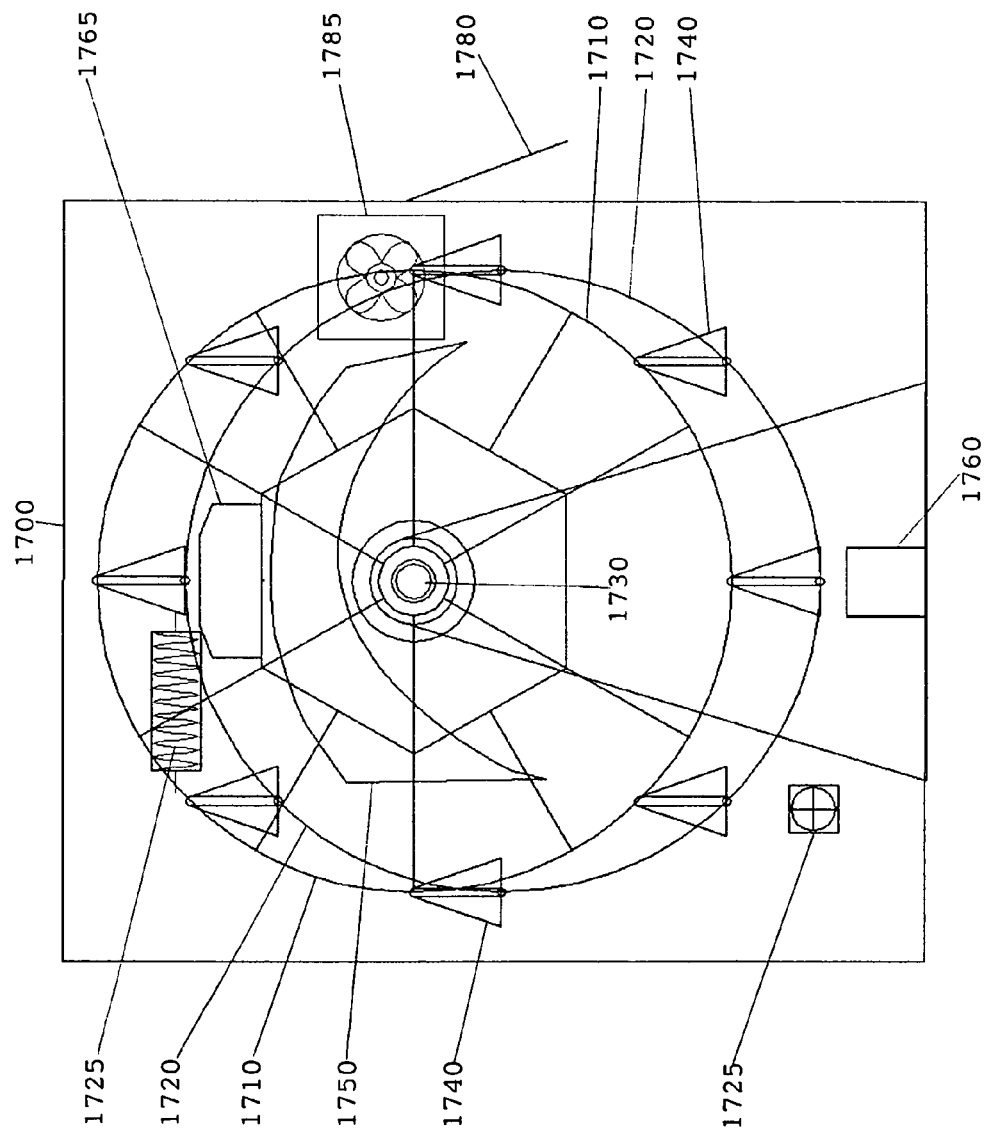
FIG. 18 is a side elevation view of the furnace of FIG. 17.

FIG. 17 and FIG. 18 show a furnace including a housing 1700 having a pair of rotating rings 1710 and a pair of fixed rings 1720. A motor 1730 is coupled to the pair of rotating rings 1710 and a plurality of trays 1740 are coupled to the pair of rotating rings 1710 and the pair of fixed rings 1720 as described previously. A heater 1725 is shown disposed at a top portion of the housing 1700. A flux foaming pot 1760 is disposed at a bottom of the housing 1700 and a solder pot 1765 is disposed at a top of the housing 1700. A heat exchanger 1750 provides heat exchange and a plurality of dryer fans 1785 dry the objects on the trays 1740. A door 1780 is provided to allow loading and unloading of the trays as well as access to the interior of the housing 1700.

Figure 19:
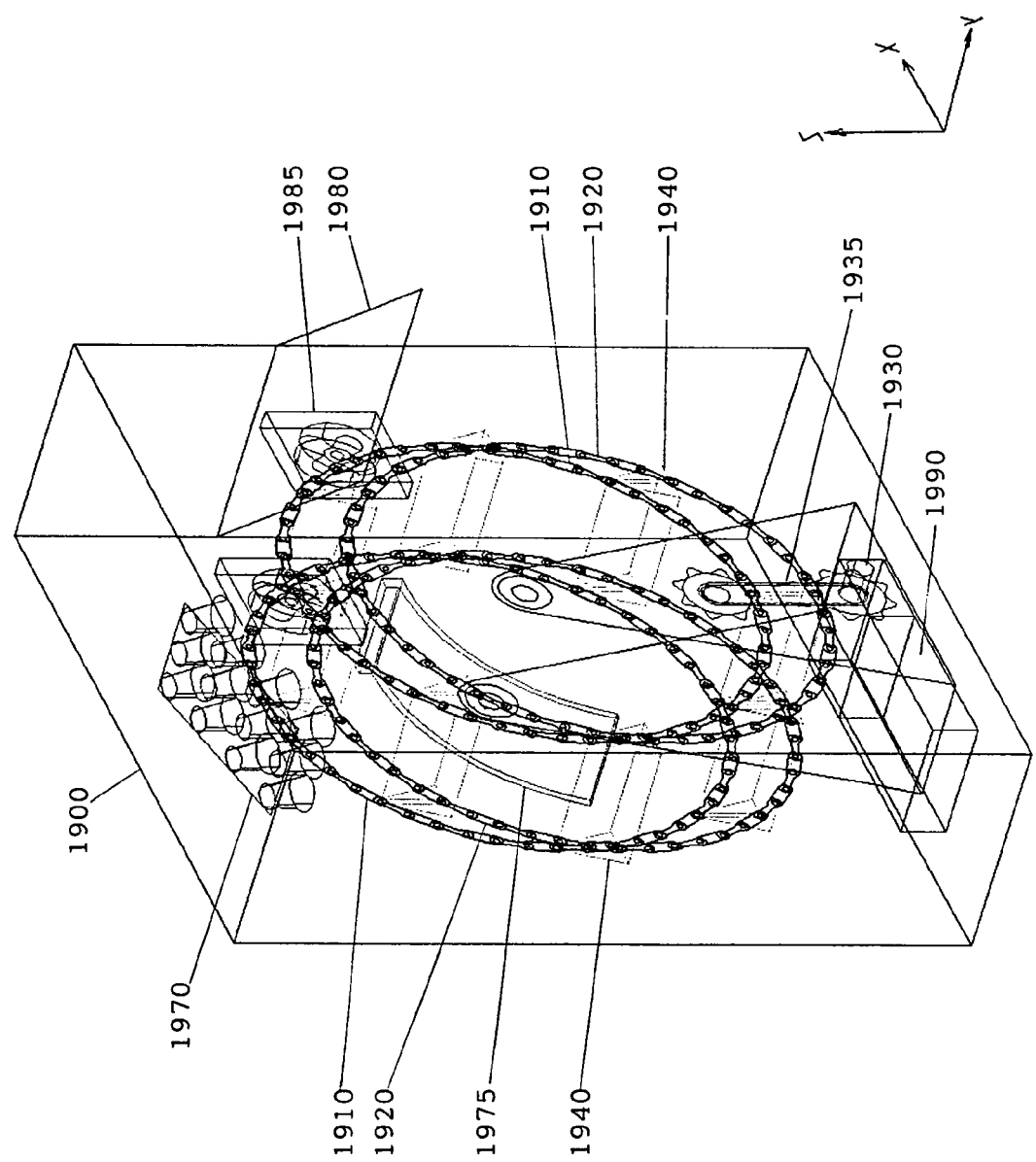
FIG. 19 is a perspective view of a furnace implemented with two pairs of circular rotating chains to implement a cleaning process in accordance with the invention.
Figure 20:
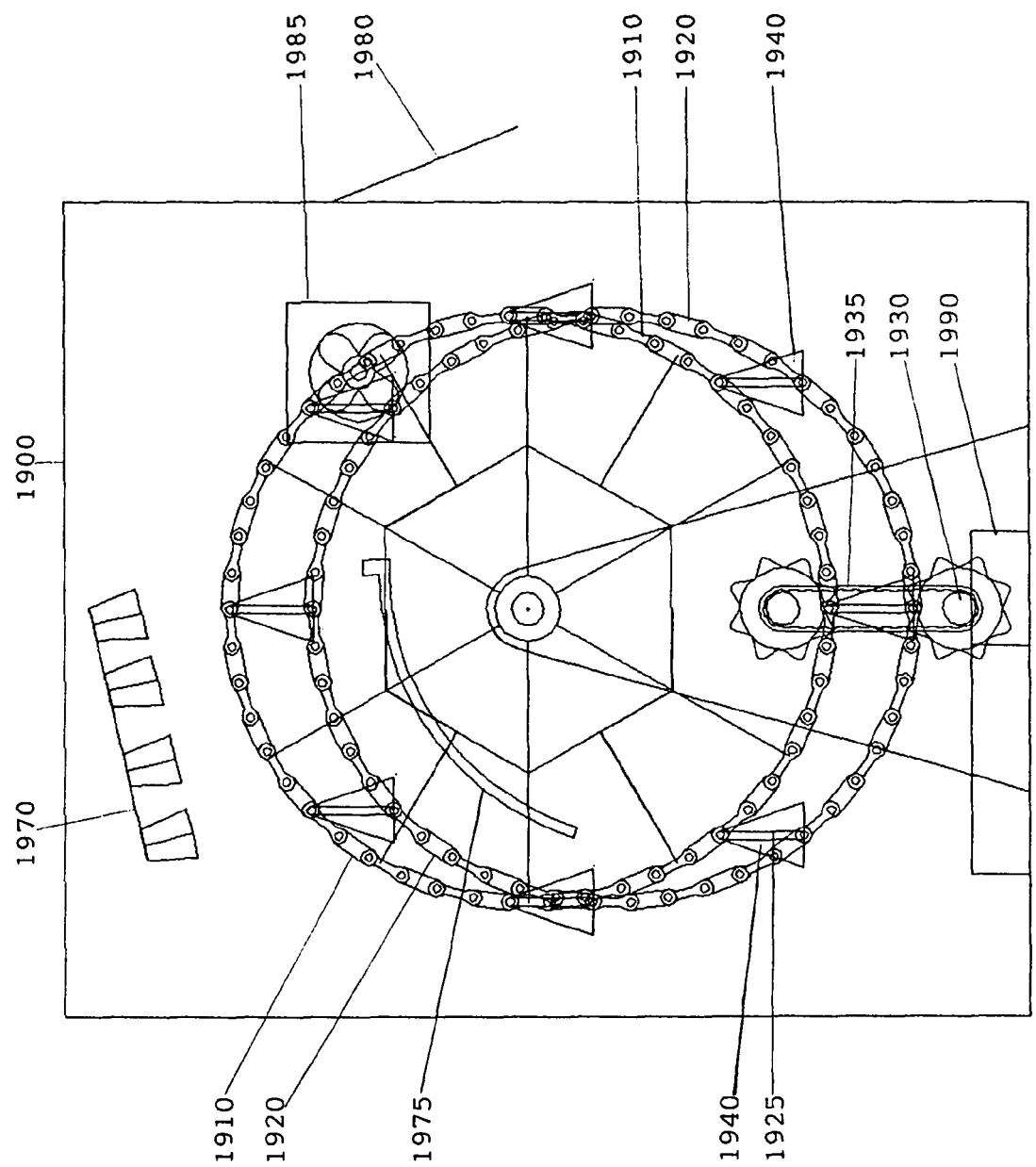
FIG. 20 is a side elevation view of the furnace of FIG. 19.

With reference to FIG. 19 and FIG. 20, a cleaning system includes a housing 1900 having a pair of driving chains 1910 and a pair of synchronized driven chains 1920. A timing chain or belt 1935 couples the pair of driving chains 1910 and the pair of synchronized driven chains 1920. Linking bars 1925 extend between the driving chains 1910 and the synchronized driven chains 1920 and provide for smoother rotation of the trays 1940 and for increased synchronization between movement of the driving chains 1910 and the synchronized driven chains 1920. A motor is coupled to the pair of driving chains 1910. The plurality of trays 1940 are coupled between the pair of driving chains 1910 and the pair of synchronized driven chains 1920 as previously described. An array of stray nozzles 1970 are disposed in a top portion of the housing 1900 and spray from the stray nozzles 1970 is collected by a collector 1975. The collected spray is directed to a collection tank 1990. A plurality of dryer fans 1985 are disposed in the housing 1900 to dry objects on the trays 1940.

Figure 21:
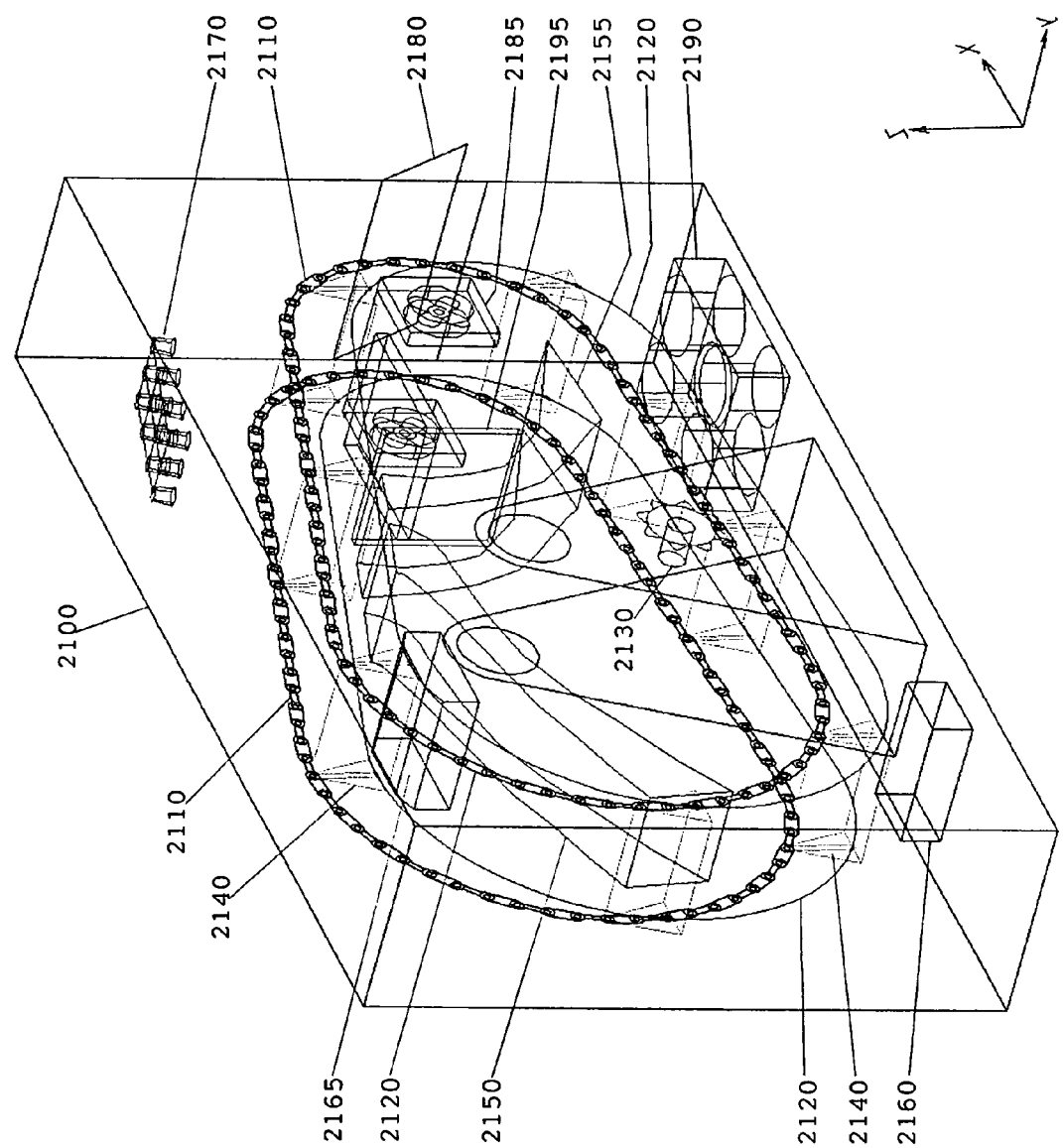
FIG. 21 is a perspective view of a furnace implemented with one pair of eyedropper shaped rotating chains and one pair of fixed rings in accordance with the invention.
Figure 22:
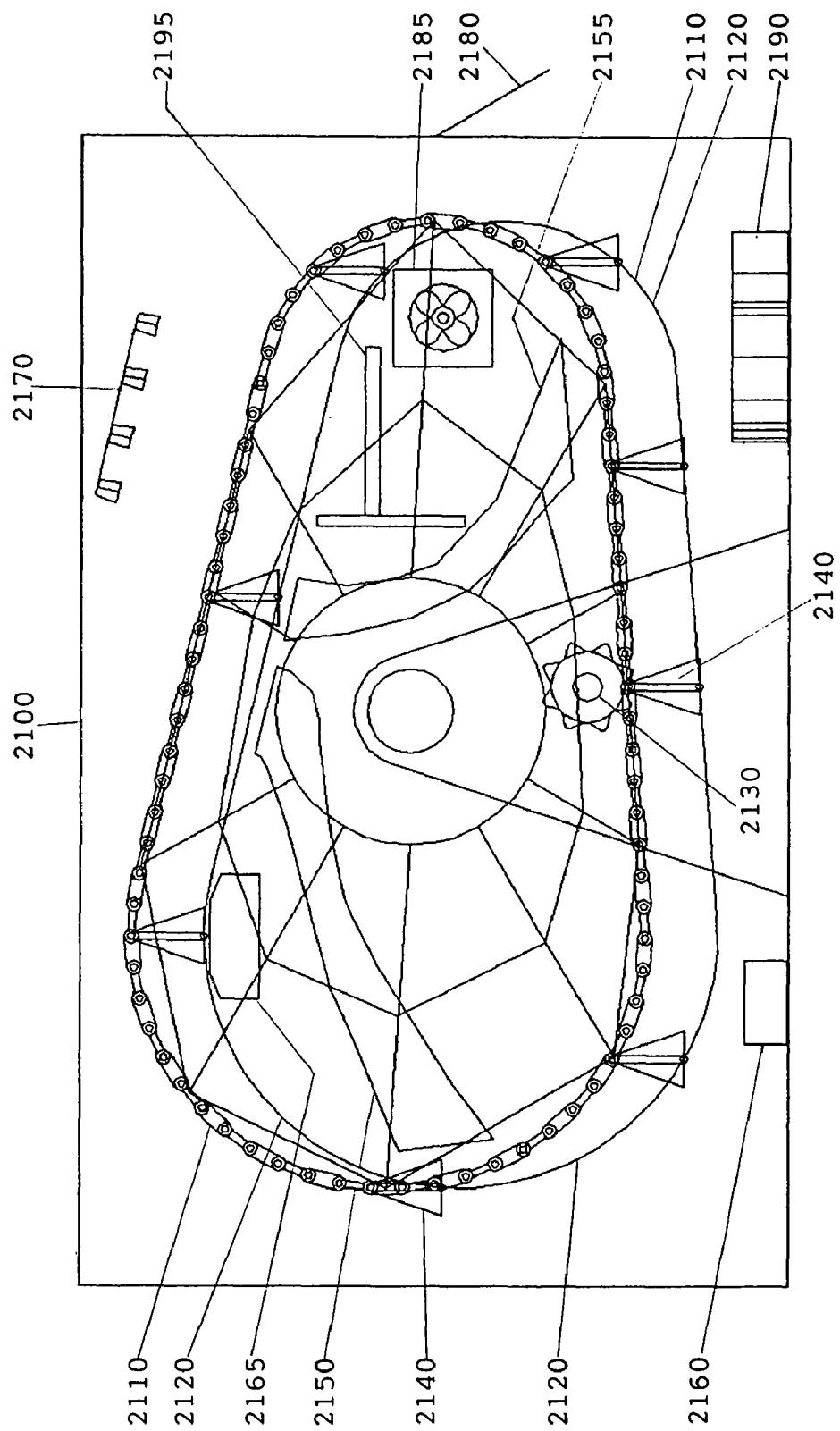
FIG. 22 is a side elevation view of the furnace of FIG. 20 in accordance with the invention.

FIG. 21 and FIG. 22 show a combined furnace and cleaning system in a housing 2100 including a pair of rotating chains 2110 and a pair of fixed rings 2120. A motor 2130 is coupled to the pair of rotating chains 2110 and a plurality of trays 2140 are coupled to the pair of rotating chains 2110 and the pair of fixed rings 2120 as previously described. The pair of rotating chains 2110 and the pair of fixed rings 2120 are teardrop shaped to provide space for each of the furnace and cleaning processes. A flux foaming unit 2160 is disposed on a bottom of the housing 2100 on a left hand side thereof and a solder pot 2165 is disposed on a top portion of the housing 2100 on the left hand side thereof. A heat exchanger 2155 is provided. An array of spray nozzles 2170 is disposed on a top portion of the housing 2100 on a right hand side thereof. A collector 2195 is disposed under the array of spray nozzles 2170 to collect material sprayed and direct it to a collection tank 2190 disposed on the bottom of the housing 2100 on a right hand side thereof. A plurality of dryer fans 2185 are disposed on the right hand side of the housing 2100 to dry objects on the trays 2140.

Figure 23:
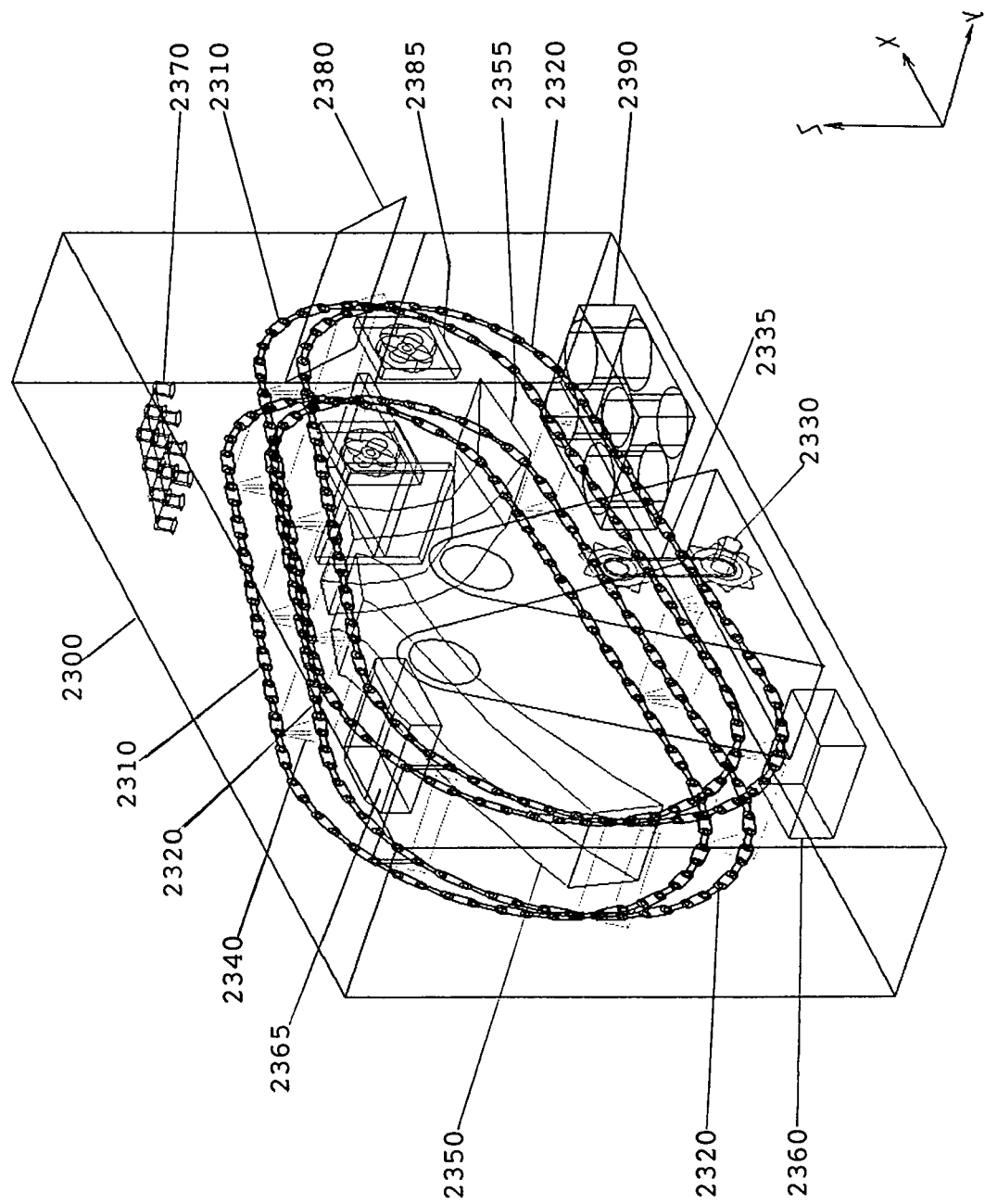
FIG. 23 is a perspective view of a furnace implemented with two pairs of eyedropper shaped rotating chains in accordance with the invention.
Figure 24:
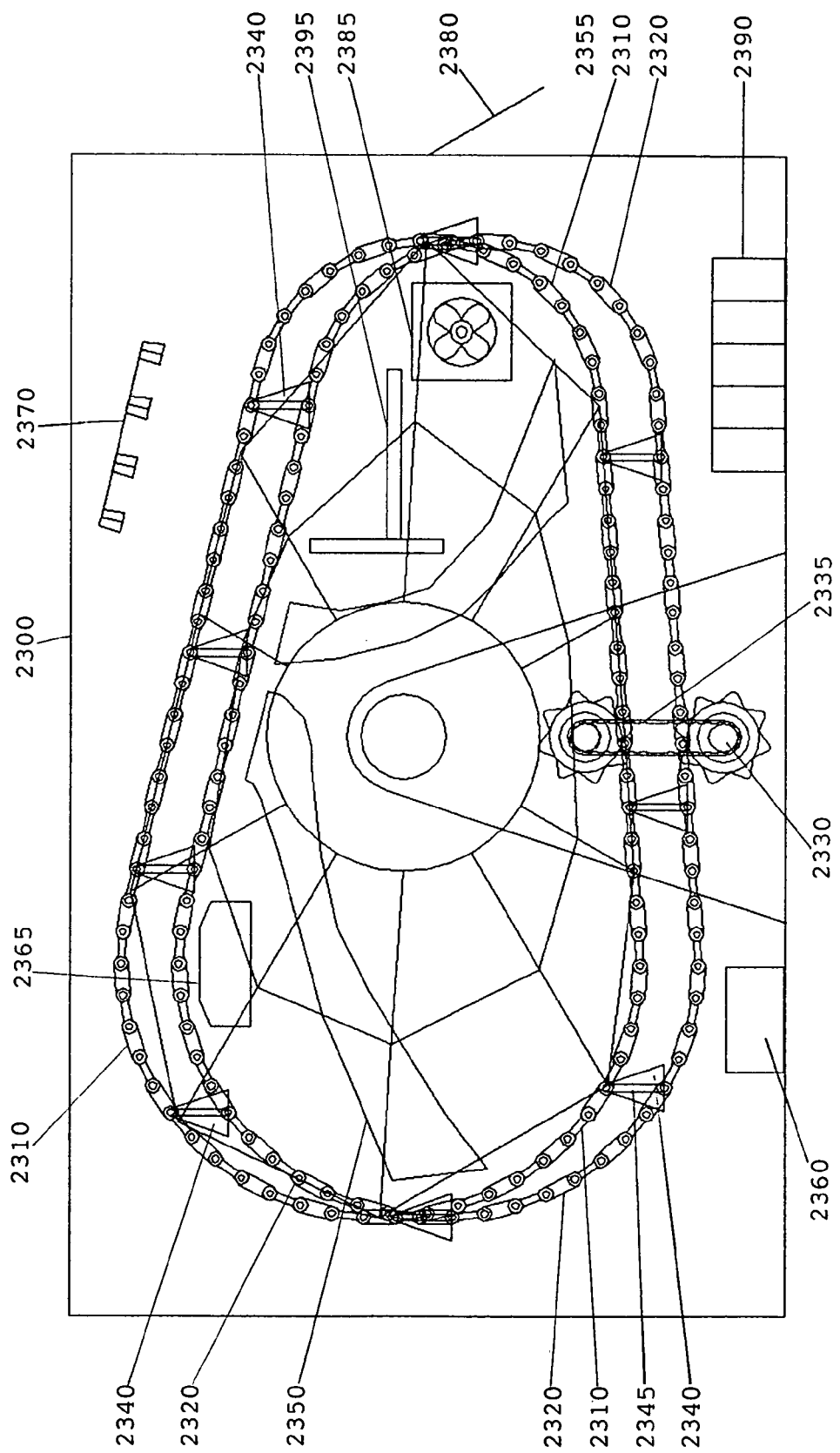
FIG. 24 is a side elevation view of the furnace of FIG. 23 in accordance with the invention.

With regard to FIG. 23 and FIG. 24, a combined furnace and cleaning system in a housing 2300 including a pair of driving chains 2310 and a pair of synchronized driven chains 2320. A timing chain or belt 2335 couples the pair of driving chains 2310 and the pair of synchronized chains 2320. Linking bars 2345 extend between the driving chains 2310 and the synchronized driven chains 2320 and provide for smoother rotation of the trays 2340 and for increased synchronization between movement of the driving chains 2310 and the synchronized driven chains 2320. A motor 2330 is coupled to the pair of driving chains 2310 and a plurality of trays 2340 are coupled to the pair of driving chains 2310 and the pair of synchronized driven chains 2320 as previously described. The pair of driving chains 2310 and the pair of synchronized driven chains 2320 are teardrop shaped to provide space for each of the furnace and cleaning processes. A flux foaming unit 2360 is disposed on a bottom of the housing 2300 on a left hand side thereof and a solder pot 2365 is disposed on a top portion of the housing 2300 on the left hand side thereof. Heat exchangers 2350 and 2355 are provided. An array of spray nozzles 2370 is disposed on the top portion of the housing 2300 on a right hand side thereof. A collector 2395 is disposed under the array of spray nozzles 2370 to collected material sprayed and direct it to a collection tank 2390 disposed on the bottom of the housing 2300 on a right hand side thereof. A plurality of dryer fans 2385 are disposed on the right hand side of the housing 2300 to dry objects on the trays 2340.

In another aspect of the invention, the linking bars extending between the driving chains and the driven chains may be eliminated in cases where synchronization is not needed. In this case, a pair of driving chains may be coupled to a pair of driven chains by a timing chain or belt. The driving chains are driven by a motor.

The apparatus having rotating chains or rings for carrying vertically hanging trays of the invention provides for a cheaper, simpler, faster, and more energy efficient apparatus of carrying out heating processes required in varied applications. The apparatus is smaller, more convenient to operate, and can be easily adapted for use in different kinds of operational environments for broader applications such as in hospitals.

Some of the uses of the apparatus and its various configurations are summarized in the table below.

TABLE 1

| Shape/Format | Circle | Ellipse | Teardrop | Irregular |
|---|---|---|---|---|
| Rotating Ring & Stationary Ring | Furnace and Cleaner | | | |
| Driving Chain & Stationary Ring | Furnace and Cleaner and Medical Applications | Furnace and Cleaner and Medical Applications | Furnace and Cleaner and Furnace/Cleaner and Medical Applications | Furnace and Cleaner and Furnace/Cleaner and Medical Applications |
| Driving Chain & Synchronized Driven Chain | Furnace and Cleaner and Medical Applications | Furnace and Cleaner and Medical Applications | Furnace and Cleaner and Furnace/Cleaner and Medical Applications | Furnace and Cleaner and Furnace/Cleaner and Medical Applications |
| Driving Chain & Driven Chain | Furnace and Cleaner and Medical Applications | Furnace and Cleaner and Medical Applications | Furnace and Cleaner and Furnace/Cleaner and Medical Applications | Furnace and Cleaner and Furnace/Cleaner and Medical Applications |

I claim:

1. An apparatus for carrying a plurality of vertically hanging trays comprising:
   a vertical rotating means comprising a first pair of rotating chains carrying the plurality of trays at respective top bars thereof and a second pair of rotating chains coupled to each top bar through linking bars, the first and second pairs of rotating chains being operatively coupled,
   wherein the first pair of rotating chains comprise a driving chain driven by a motor and the second pair of rotating chains comprise a driven chain coupled to the first pair of rotating chains by a timing belt.

2. The apparatus of claim 1, wherein the first and second pairs of rotating chains have geometric centers vertically offset from each other.

3. The apparatus of claim 1, wherein each linking bar is fixedly coupled to a respective top bar.

4. The apparatus of claim 1, wherein the vertical rotating means is disposed in a housing having an opening.

5. The apparatus of claim 4, wherein the plurality of trays are alternatively accessible through the opening.

6. The apparatus of claim 4, further comprising a furnace apparatus and a cleaning apparatus disposed in the housing.

7. The apparatus of claim 6, wherein the furnace apparatus comprises a heat source, a flux foaming pot and a solder pot.

8. The apparatus of claim 6, wherein the cleaning apparatus comprises:
   an array of spray nozzles. a collector and a collection tank.

9. The apparatus of claim 1, wherein the first and second pairs of rotating chains are circular.

10. The apparatus of claim 1. wherein the first and second pairs of rotating chains are elliptical.

11. The apparatus of claim 1, wherein the first and second pairs of rotating chains are of irregular shape.

12. The apparatus of claim 1, wherein the first and second pairs of rotating chains are teardrop shaped.

13. The apparatus of claim 1, wherein the second pair of rotating chains comprise a synchronized pair of driven chains coupled to the first pair of rotating chains by a timing belt and the linking bars.

* * * * *